(12) United States Patent
Kimura et al.

(10) Patent No.: US 8,491,737 B2
(45) Date of Patent: Jul. 23, 2013

(54) CONTINUOUS WEB OF OPTICAL FILM LAMINATE WITH PREDEFINED SLIT LINES, AND METHOD AND SYSTEM FOR MANUFACTURING THE SAME

(75) Inventors: Kouji Kimura, Osaka (JP); Takayoshi Yamano, Osaka (JP); Takuya Nakazono, Osaka (JP); Kazuo Kitada, Osaka (JP); Tomokazu Yura, Osaka (JP); Fumihito Shimanoe, Osaka (JP); Satoru Koshio, Osaka (JP); Shouji Shibata, Osaka (JP)

(73) Assignee: Nitto Denko Corporation, Osaka (JP)

( * ) Notice: Subject to any disclaimer, the term of this patent is extended or adjusted under 35 U.S.C. 154(b) by 82 days.

(21) Appl. No.: 13/460,764

(22) Filed: Apr. 30, 2012

(65) Prior Publication Data

US 2012/0216937 A1  Aug. 30, 2012

Related U.S. Application Data

(60) Division of application No. 12/849,341, filed on Aug. 3, 2010, which is a continuation of application No. PCT/JP2009/001689, filed on Apr. 13, 2009.

(30) Foreign Application Priority Data

Apr. 15, 2008 (WO) .................. PCT/JP2008/000987

(51) Int. Cl.
*B32B 41/00* (2006.01)

(52) U.S. Cl.
USPC ............... 156/64; 156/60; 156/350; 156/351; 156/353; 156/362; 156/363; 156/378; 156/379

(58) Field of Classification Search
USPC ............. 156/60, 64, 350, 351, 353, 362, 363, 156/378, 379
See application file for complete search history.

(56) References Cited

U.S. PATENT DOCUMENTS 5,929,961 A * 7/1999 Nishi et al. .................... 349/187
2005/0016670 A1 1/2005 Kanbara et al.
(Continued)

FOREIGN PATENT DOCUMENTS

JP   55-120005   9/1980
JP   57-052017   3/1982
(Continued)

OTHER PUBLICATIONS

International Search Report mailed Jul. 28, 2009 for PCT/JP2009/001689.
(Continued)

*Primary Examiner* — Katarzyna Wyrozebski Lee
*Assistant Examiner* — Joshel Rivera
(74) *Attorney, Agent, or Firm* — Lowe Hauptman Ham & Berner LLP

(57) ABSTRACT

An optical film laminate that has predefined slit lines for enhancing both product accuracy and manufacturing speed in liquid-crystal display element manufacturing to radically improve manufacturing yield. The optical film laminate formed as a continuous web with the predefined slit lines for use in a continuous manufacturing system by laminating optically functional film sheets to liquid-crystal panels. The optical film laminate having defect-free regions having a predefined length corresponding to the dimension of a liquid-crystal panel and defective regions having a predefined length different from the defect-free region, based on the detected position of defects. The optical film laminate having a carrier film releasably laminated to an adhesive layer, wherein defect-free normal polarizing sheets and a defective polarizing sheets are formed on the carrier film by forming slit lines corresponding to above regions along the transverse direction of the optical film laminate.

15 Claims, 20 Drawing Sheets

U.S. PATENT DOCUMENTS

| | | | |
|---|---|---|---|
| 2009/0053964 A1* | 2/2009 | Nozaki | 445/25 |
| 2011/0284147 A1* | 11/2011 | Nakazono et al. | 156/64 |

FOREIGN PATENT DOCUMENTS

| JP | 57-52018 | 3/1982 |
|---|---|---|
| JP | 57-052019 | 3/1982 |
| JP | 57052017 | 3/1982 |
| JP | 61-93406 | 5/1986 |
| JP | 62-014810 | 4/1987 |
| JP | 07-157186 | 6/1995 |
| JP | 7-174918 | 7/1995 |
| JP | 7-311160 | 11/1995 |
| JP | 2001-349839 | 12/2001 |
| JP | 2002-023151 | 1/2002 |
| JP | 2003-149164 | 5/2003 |
| JP | 2003-161935 | 6/2003 |
| JP | 2003-202298 | 7/2003 |
| JP | 2004-144913 | 5/2004 |
| JP | 2004-333647 | 11/2004 |
| JP | 2004-338408 | 12/2004 |
| JP | 2004-345354 | 12/2004 |
| JP | 2004-361741 | 12/2004 |
| JP | 2005-037416 | 2/2005 |
| JP | 2005-037417 | 2/2005 |
| JP | 2005-043384 | 2/2005 |
| JP | 3616866 | 2/2005 |
| JP | 2005-062165 | 3/2005 |
| JP | 2005-114624 | 4/2005 |
| JP | 2005-298208 | 10/2005 |
| JP | 2005-305999 | 11/2005 |
| JP | 2005-306604 | 11/2005 |
| JP | 2005-309371 | 11/2005 |
| JP | 2005-347618 | 12/2005 |
| JP | 2006-058411 | 3/2006 |
| JP | 2007-064989 | 3/2007 |
| JP | 2007-140046 | 6/2007 |
| JP | 3974400 | 9/2007 |

OTHER PUBLICATIONS

International Search Report mailed Jan. 15, 2008 for PCT/JP2007/069967.

* cited by examiner

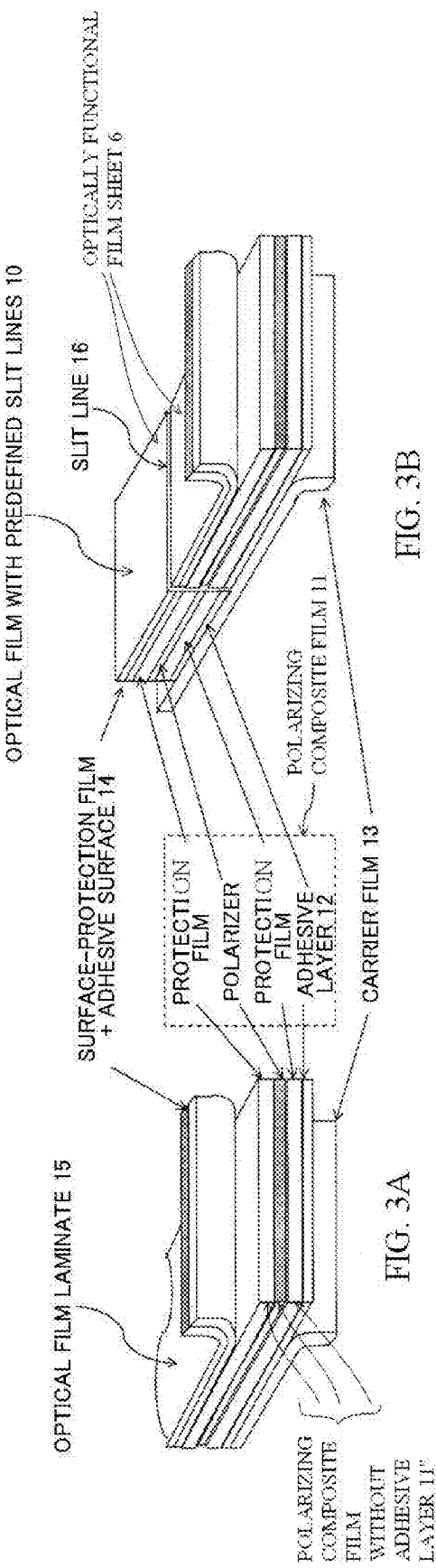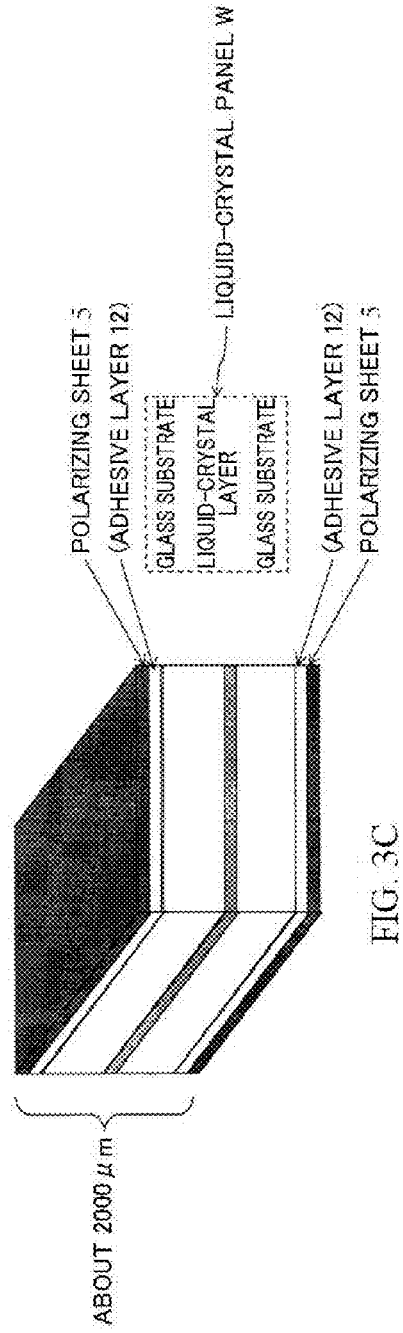
FIG. 3A
FIG. 3B
FIG. 3C

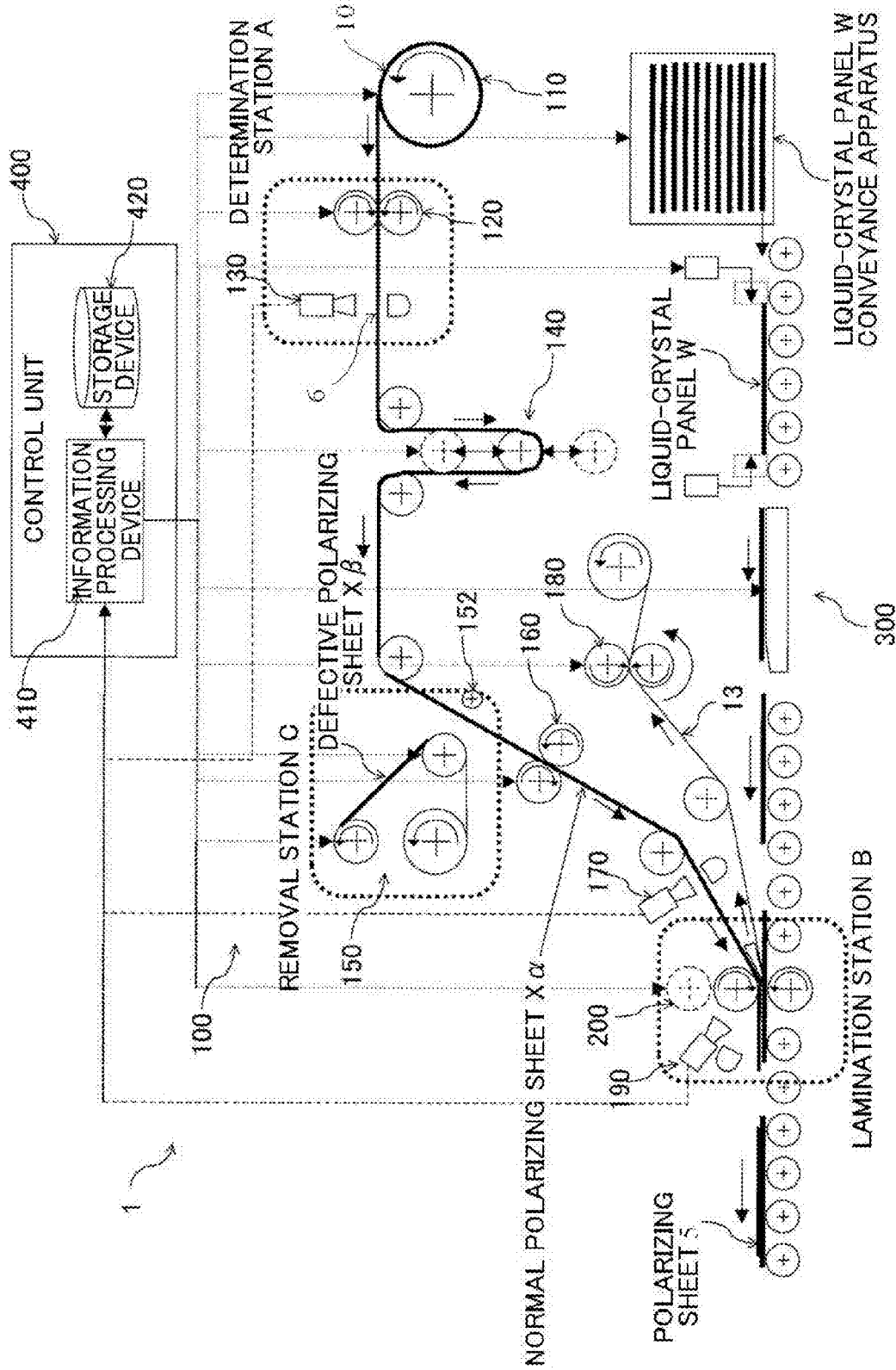

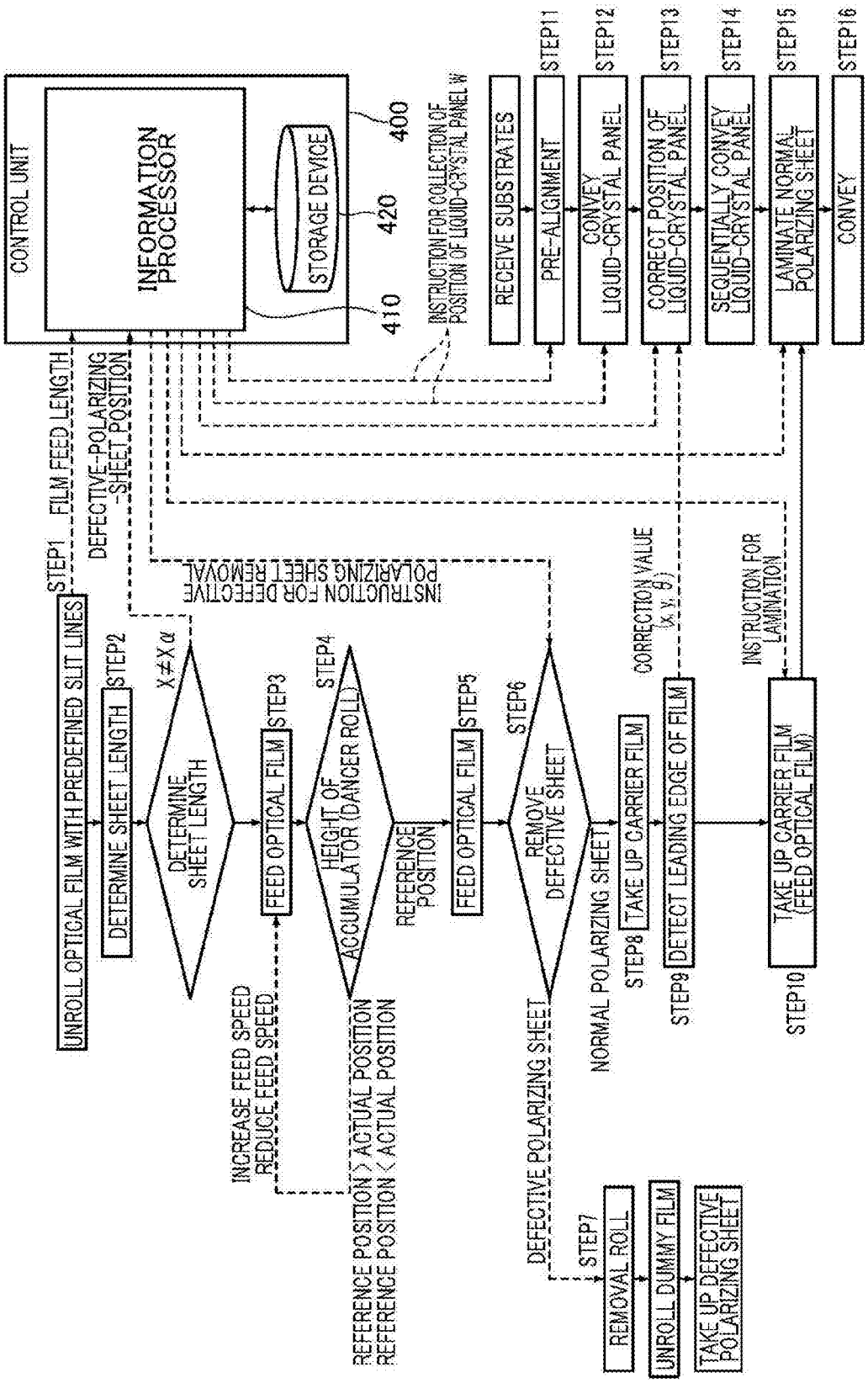

FIG.20

| INSPECTION UNIT | TYPE OF DEFECT | | | | |
|---|---|---|---|---|---|
| | INTERNAL FOREIGN SUBSTANCES | INTERNAL PORES | BRIGHT SPOTS | SURFACE IRREGULARITIES | FLAW/UNDULATION |
| REFLECTION | △ | △ | × | ○ | ○ |
| TRANSMISSION | ○ | ○ | △ | △ | × |
| DEFECT DETECTION BY CROSS-NICHOL CONDITION | ○ | ○ | ○ | × | ○ |

CONTINUOUS WEB OF OPTICAL FILM LAMINATE WITH PREDEFINED SLIT LINES, AND METHOD AND SYSTEM FOR MANUFACTURING THE SAME

CROSS REFERENCE TO RELATED APPLICATIONS

The present application is a Divisional Application of U.S. patent application Ser. No. 12/849,341, filed Aug. 3, 2010, which is a Continuation Application of PCT application number PCT/JP2009/001689 filed Apr. 13, 2009, which claims priority from PCT application number PCT/JP2008/000987, filed on Apr. 15, 2008, the disclosure of which is hereby incorporated by reference herein in its entirety.

TECHNICAL FIELD

The present disclosure relates to a continuous web of an optical film laminate with predefined slit lines, and a method and system for manufacturing the same, the film laminate web being adapted for use in a system for sequentially manufacturing LCD (Liquid-Crystal Display).

BACKGROUND

For a liquid-crystal display element to function, the direction of orientation of liquid-crystal molecules and the direction of polarization of the polarizer must be set in a particular relation to each other. In liquid-crystal display element technologies, LCDs using a TN (Twisted Nematic) type liquid-crystal were the first to be put into practical use. Recently, LCDs using a VA (vertical Alignment) type liquid-crystal, an IPS (Inplane Switching) type liquid-crystal etc., were put into practical use. Although a technical explanation is omitted, in an LCD using such TN-type liquid-crystal panel, liquid-crystal molecules are provided between two upper and lower orientation films having respective rubbing directions on the inner surfaces of the substrates of the liquid-crystal panel. This means that the liquid-crystal molecules are twisted by 90 degrees along the optical axis, so that when a voltage is applied, the liquid-crystal molecules are aligned in a direction perpendicular to the orientation films. However, in the case where the LCD is designed to allow images as seen from right and left sides of a display screen as those view from directly in front of the display screen, the direction of rubbing on the orientation film at the viewing-side must be 45 degrees (the rubbing direction of the other orientation film being 135 degrees). It is therefore necessary that the polarizing sheets made from the polarizing composite films to be laminated respectively on the front and back sides of the liquid-crystal panel with polarizers respectively oriented in directions inclined respectively by 45 degrees with respect to a lengthwise or widthwise direction of the display screen so as to conform to the rubbing directions.

Therefore, in a polarizing sheet for use in producing a liquid-crystal display element of a TN-type liquid-crystal panel, it is required that the optical film is punched or cut into a rectangular-shaped sheet having a long side or a short side determined in accordance with the size of the TN liquid-crystal panel, and inclined by 45 degrees with respect to the orientation direction of the polarizer produced by stretching in the lengthwise or widthwise direction. This is described in Japanese Laid-Open Patent Publication No. JP 2003-161935A or Japanese Patent No. 3616866 B. The width or the short side dimension of the optical film sheet to be processed into the rectangular shape is smaller than the width of the optical film.

The punching or cutting of the optical film into the rectangular-shaped sheet may be collectively referred to as "individualized sheets" or "a method and system for manufacturing individualized sheets" for liquid-crystal display elements. The optical film sheet thus punched or cut is produced by integrally punching or cutting not only the surface-protection film but also the carrier film protecting the exposed surface of the adhesive layer in the polarizing composite film. The integrally punched-out or cut carrier film sheet may be referred to as "separator," rather than "carrier film sheet" because it is not serving as a transport medium. Thus, the manufacturing process of the liquid-crystal display elements includes the first step of peeling the separator from each of the optical film sheet to have the adhesive layer in the polarizing sheet exposed. Subsequently, the polarizing sheets each having the adhesive layer exposed are conveyed one-by-one, for example, under a vacuum suction irrespective of whether the surface-protection films are laminated on the polarizing sheets or not, and laminated to respective ones of a plurality of liquid-crystal panels. According to the aforementioned manufacturing process of the liquid-crystal display elements, it has been required that the integrally punched-out or cut sheet from the optical film is in the form of an individualized sheet having four trimmed sides and a certain level of stiffness of less deflection or bend and which can be conveyed and laminated easily. During the initial period in the history of the manufacturing process of the liquid-crystal display elements, the optical film sheet or a polarizing sheet comprised in such optical film sheet was generally known as a "polarizing plate" which is still used as a common name.

In the manufacturing process of TN-type liquid-crystal display elements, an optical film fed out from a roll of continuous web is integrally and sequentially punched-out or cut in a direction transverse to the feed direction. However, in this case, it is impossible to obtain a finished liquid-crystal display element simply by sequentially laminating the sheets formed to respective ones of a plurality of liquid-crystal panels. This is because the sheets each formed with a long or short side extending in a direction 45 degrees cannot be laminated sequentially to respective ones of the liquid-crystal panels with the same posture. Therefore, to provide a finished liquid-crystal display element by transporting a polarizing sheet to a position for lamination with a liquid-crystal panel, and then laminating the polarizing sheet to the liquid-crystal panel, an optical film in the form of a continuous web having a width greater than a long side of a liquid-crystal panel is fed out in a lengthwise direction, and each of the sheets are punched-out at an angled direction of 45 degrees with respect to the lengthwise direction, using, for example, a die into a plurality of individual polarizing sheet, and appropriately fed to the lamination process with the liquid-crystal panel, as shown in the Japanese Laid-Open Patent Publication No. 2003-161935A or Japanese Patent No. 3616866B. Alternatively, manufacturing methods for liquid-crystal display elements are provided wherein one of the methods uses a single sheet formed from the continuous web of the optical film, the single sheet having a substantially large width by punching or cutting the optical film in a direction 45 degrees inclined with respect to the lengthwise direction as shown in the Japanese Patent Publication No. 62-14810B or Japanese Laid-Open Patent Publication No. 55-120005A. The liquid-crystal display element is produced by making the elongated optical film having a width of the liquid-crystal panel thus formed into a continuous roll, feeding the elongated optical film from the continuous roll, forming a plurality of sheets having required length by cutting the film in the widthwise direction with respect to its feed direction and laminating the plurality of the polarizing sheets contained in the sheet to respective one of liquid-crystal panels W sequentially conveyed. At any rate, the above techniques are not beyond the system for manufacturing individualized sheets based on the premise of TN-type liquid-crystal display elements.

Japanese Patent Publication No. 62-14810B discloses, prior to the VA-type liquid-crystal and the IPS-type liquid-crystal being brought into practical use, an apparatus to produce a liquid-crystal panel. Japanese Patent Publication No. 62-14810B further discloses a technique of continuously feeding out an optical film which comprises a polarizing composite film (in Japanese Patent Publication No. 62-14810B, referred to as "elongated polarizing plate") and a separator for protecting an adhesive layer on the polarizing composite film, "cutting only the polarizing plate 4 and the adhesive layer 5 while leaving the separator 6 uncut (hereinafter referred to as "half-cut")," removing defective polarizing sheets formed in the course of the feeding, sequentially laminating the peeled sheets onto a plurality of liquid-crystal panels (referred to as "liquid-crystal cells") for constituting small-size display screens of electronic calculators or the like, while peeling the separator from the polarizing sheets which have been retained on the separator. The apparatus is a labeler unit which produces an LCD using the TN-type liquid-crystal. Thus, the optical film to be used, of course, must be an elongated sheet produced from an optical film having substantially large width by cutting it in a direction 45 degrees oblique to the longitudinal direction of the optical film with a width corresponding to the width of the liquid-crystal panel. Therefore, this apparatus cannot be applied directly to a manufacturing apparatus adapted to perform steps of continuously forming a plurality of polarizing sheets from an optical film and laminating respective sheets to respective ones of the liquid-crystal panel using VA-type or IPS-type liquid-crystal to produce liquid-crystal display elements because of the width of optical film required.

Japanese Laid-Open Patent Publication No. 55-120005A discloses, prior to the VA-type liquid-crystal and the IPS-type liquid-crystal being brought into practical use, an apparatus to produce a liquid-crystal display element by sequentially laminating a plurality of sheets formed into a required length to a plurality of liquid-crystal panels while continuously feeding out an optical film containing a polarizing composite film. In the manufacturing method disclosed an adhesive layer is formed on a large-width polarizing composite film. A plurality of elongated polarizing composite film sheets having a required width are cut out from the large-width polarizing composite film. These sheets are laminated to separately prepared conveyance medium (i.e., carrier film) subjected to a releasing treatment to produce an optical film. Then, the optical film is half-cut in a vertical direction by two knives provided with a required distance with respect to a longitudinal direction, leaving the conveyance medium uncut, the optical film sheet is continuously formed separated from each other on the conveyance medium, and the plurality of formed sheets are sequentially laminated to respective ones of the liquid-crystal panels being conveyed to manufacture the liquid-crystal element. This apparatus is also based on the use of an elongated polarizing sheet which is cut in a direction 45 degrees oblique to the stretching direction of the polarizing composite film with a width corresponding to the width of the liquid-crystal panel, so that it cannot be applied directly to a manufacturing apparatus adapted to VA-type or IPS-type liquid-crystal to produce liquid-crystal display elements.

Automation of manufacturing process for liquid-crystal display elements using individualized sheets is described, for example, in Japanese Laid-Open Patent Publication No. 2002-23151A. Flexible individualized sheets tend to be bowed or warped due to curves or distortion of its edge, and thus it is a serious technical impediment to accuracy and speed in registration and lamination with liquid-crystal panels. Thus, it will be understood that the individualized sheet is required to have a certain level of thickness and stiffness to facilitate registration and lamination with liquid-crystal panels typically in transportation under suction. For example, the disclosures in the Japanese Laid-Open Patent Publication No. 2004-144913A, Japanese Laid-Open Patent Publication No. 2005-298208A or Japanese Laid-Open Patent Publication No. 2006-58411A disclose measures for addressing such technical problems.

On the other hand, the VA-type and IPS-type liquid-crystal panels are not designed to arrange liquid-crystal molecules in twisted orientations. Thus, when producing liquid-crystal display element using these types of liquid-crystal panels, there is no need to have the polarization axis of the polarizing sheet oriented at 45 degrees. Each of these liquid-crystal display elements using these liquid-crystal panels is formed by applying sheets to the opposite sides of the liquid-crystal display panel oriented with their polarization axes crossed at 90 degrees. In the case of the VA-type and IPS-type liquid-crystal panels, with respect to the viewing angle characteristics, maximum contrast can be obtained along the direction of the polarizing axis of the polarizing sheet, so that the sheets have polarizing axes oriented in parallel with the longitudinal or transverse direction of the liquid-crystal panel from the technical view point of symmetry of the viewing angle characteristics and visibility. Thus, these sheets to be applied to the liquid-crystal panel has a feature that the optical film including a polarizing composite film which has been subjected to a longitudinal or transverse stretching can be continuously fed out from a roll and cut along transverse lines with respect to the feed direction of the optical film to sequentially produce rectangular polarizing sheets including the polarizing sheets having the same width as the optical film width.

Because of the improved viewing angle characteristics, VA-type liquid-crystal or the IPS-type liquid-crystal are more widely adopted than the TN type. In view of such trend in environments of technical developments, proposals have been made such as the one described in Japanese Laid-Open Patent Publication No. 2004-361741A which is based on use of the VA-type or IPS-type liquid-crystal panels and comprises steps of continuously feeding an optical film laminate comprising a polarizing composite film, cutting the optical film laminate in conformity to the size of a liquid-crystal panel and sequentially laminating a plurality of sheets which have been produced by the cutting step to respective ones of a plurality of the liquid-crystal panels.

However, the mainstream of manufacture of liquid-crystal display elements is still based on the manufacturing technology utilizing individualized sheets, due to the following technical problems. In manufacturing liquid-crystal display elements, a critical technical challenge is to detect any defect which may otherwise be retained in the display elements to be formed, and to prevent any defective product from being produced. This makes it possible to significantly improve manufacturing yield. Most of the product defects primarily arise from defects in the polarizing composite film contained in the optical film. However, it is not practical to provide an optical film after completely removing all defects contained in individual films which are to be laminated together to form the optical film. The reason is that, observation for defects in the polarizing composite film on all of the polarizer and the protection film laminated on the polarizer to provide a polarizing composite film having no adhesive layer formed thereon, and an adhesive layer formed on the polarizing composite film indicates that there are various kinds of defects, including defects inherent in the PVA film of the polarizer itself, defects arose in connection with the lamination of the protection film to the polarizer and defects generated in the adhesive layer of the formed polarizing composite film, distributed in 20 to 200 positions over a unit length of the polarizing composite film of 1000 m. Thus, it is extremely difficult to produce a defect-free optical film under existing circumstances. To maintain quality of display elements, it is not permitted to use a polarizing composite film sheet having visible flaws or defects for a sheet for television display element even if such a flaw or defect is small. Therefore, if lengths of the polarizing composite film with defects are used to form a display and a display requires 1 m of film, 20 to 200 defective liquid-crystal display elements out of 1,000 products will be produced.

A proposed preliminary inspection apparatus for a polarizing composite film, is disclosed, for example, in Japanese Patent No. 3974400B and Japanese Laid-Open Patent Publications Nos. 2005-62165A and 2007-64989A.

Japanese Laid-Open Patent Publication 2007-140046A discloses a method that comprises peeling a carrier film from an optical film fed out continuously from a continuous roll to expose a polarizing composite film having an adhesive layer, detecting a defect or defects present in the polarizing composite film, punching or cutting only normal regions of a polarizing composite film into a rectangular shape, while leaving the defective region or regions of the polarizing composite film untouched. Japanese Patent Application No. 2007-266200 is a disclosure relating to a method and a system for laminating a polarizing sheet to a liquid-crystal panel. However, the method and system disclosed cause not only substantial complexity in the entire system for laminating but also an increase in the number of steps and difficulty in control for each step, and therefore, cause corresponding reduction in the manufacturing speed.

The present disclosure has been made based on the above related disclosures and through intensive researches and considerations for significantly enhancing product accuracy and manufacturing speed, and drastically improving manufacturing yield, in the manufacture of liquid-crystal display elements.

SUMMARY

The present disclosure is based on findings that solutions of the aforementioned technical problems can be achieved by forming slit lines, in a transverse direction of an optical film laminate, at positions corresponding to regions defined in accordance with position or positions of one or more defects existing in and detected through a preliminary inspection of a continuous web of the optical film laminate, the optical film laminate being adapted for use in a system for sequentially manufacturing liquid-crystal display elements by laminating optically functional film sheets to respective ones of liquid-crystal panels, wherein the optically functional film is formed to have a predefined dimension corresponding to a dimension of a liquid-crystal panel having a predefined size to form a sheet, and wherein the slit lines define sheets which are determined as normal polarizing sheets adapted to be laminated to respective ones of the liquid-crystal panels, the normal sheets being on the carrier film which is included in the optical film laminate, and wherein the present disclosure has the following features based on the aforementioned findings.

The disclosure provides a continuous web of an optical film laminate, and a method and apparatus for producing the continuous web of an optical. The continuous web of optical film laminate optical film laminate being adapted for use in a system for sequentially manufacturing liquid-crystal display elements by laminating optically functional film sheets to respective ones of liquid-crystal panels, said optically functional film being formed to have a predefined dimension corresponding to a dimension of a liquid-crystal panel having a predefined size. The optical film laminate comprising of (1) an optically functional film; the optically functional film including, at least one defect-free region with no defects; and at least one defective region having at least one defect, the at least one defect-free region and the at least one defective region defined by predefined slit lines, (2) an adhesive layer provided on optically functional film, and (3) a carrier film releasably laminated on said adhesive layer. The defect-free and defective regions being defined along the longitudinal direction in accordance with position of a defect existing in the optically functional film and are detected through a preliminary inspection. The defect-free region having a predefined length corresponding to the dimension of the liquid-crystal panel. The defective region being defined as a region having a predefined length which is different from the length of said defect-free region. The length of the defective region being defined to include the position of the defect. The slit lines being formed in a transverse direction of said optical film laminate at a side opposite to said carrier film to a depth reaching a surface of said carrier film adjacent to said adhesive layer.

The method for producing the continuous web of an optical film laminate including the steps of (a) laminating a continuous web of a protection film on at least one of opposite surfaces of a continuous web of a polarizer film to form an optically functional film, having a longitudinal direction, (b) inspecting surfaces and inside of the optically functional film to detect a position of a defect existing in the optically functional film (c) releasably laminating a continuous web of a carrier film on the continuous web of the optically functional film by an adhesive layer to form a continuous web of the optical film laminate, wherein the optically functional film includes at least one defect-free region and at least one defective region, the at least one defect-free and at least one defective region being defined along the longitudinal direction of the optically functional film in accordance with the position of the detected defect, said defect-free region having a predefined length corresponding to said dimension of the liquid-crystal panels, said defective region including at least one defect and defined as a region having a predefined length which is different from the length of said defect-free region, the length of the defective region being defined across said position of the defect, and (d) sequentially forming slit lines in a transverse direction of said optical film laminate at a side opposite to said carrier film to a depth reaching a surface of said carrier film adjacent to said adhesive layer to form, on the carrier film, at least one defect-free, normal optically functional film sheet having no defect and at least one defective optically functional film sheet having at least one defect, and separated from the normal sheet, to thereby form a continuous web of the optical film laminate with slit lines including optically functional film sheets.

The apparatus for producing a continuous web of an optical film laminate comprising (a) a provisional optical film laminate feeding unit for feeding a provisional optical film laminate at least including a continuous web of an optically functional film and a continuous web of a provisional carrier film, the continuous web of the optically functional film including a laminated web having a polarizer in the form of a continuous web and a protection film laminated on at least one of opposite surfaces of the continuous web of the polarizer, and an adhesive layer provided on one of opposite surfaces of the laminated web, the continuous web of the provisional carrier film being releasably laminating on the adhesive layer, (b) a provisional carrier film peeling unit for peeling the provisional carrier film from the provisional optical film laminate to expose the adhesive layer of the optically functional film, (c) an inspection unit for inspecting surfaces and inside of the optically functional film with the adhesive layer in the exposed state to detect position of a defect existing in the optically functional film, (d) an optical film laminate forming unit of adapted to releasably laminate a continuous web of a carrier film on the continuous web of the optically functional film through an adhesive layer to form a continuous web of the optical film laminate, wherein the optically functional film comprising at least one defect-free region having no defect and at least one defective region, the defect-free region and the defective region being defined along longitudinal direction in accordance with the position of the detected defect, said defect-free region having a predefined length corresponding to said dimension of the liquid-crystal panels, said defective region including at least defect and defined as a region having a predefined length which is different from that the length of the defect-free region, the length of the defective region being defined across the position of the defect, (e) a slitting unit for sequentially forming slit lines in a transverse direction of said optical film laminate at a side opposite to said carrier film adjacent to said adhesive layer, said slit lines forming at least one defect-free normal sheet and at least one defective sheet having at least one defect and being separated from the normal sheet on said carrier film, to thereby form a continuous web of the optical film laminate having slit lines formed therein and including optically functional film sheets, and (f) a control unit adapted to control respective operations of at least the provisional optical film laminate feeding unit, the provisional carrier film peeling unit, the inspection unit, the optical film laminate forming unit, and the slitting unit, in an inter-related manner.

BRIEF DESCRIPTION OF THE DRAWINGS

The present disclosure is illustrated by way of example, and not by limitation, in the figures of the accompanying drawings in which elements having the same reference numeral designations represent like elements throughout and wherein:

FIGS. 3A, 3B and 3C are schematic diagrams showing the structure of an optical film laminate with predefined slit lines for use in continuous manufacturing of a liquid-crystal display element according to at least one embodiment.

FIG. 4 is a schematic diagram showing a continuous manufacturing system for liquid-crystal display elements according to one embodiment, wherein the system comprises a feed apparatus for feeding a continuous web of an optical film laminate with predefined slit lines, and a liquid-crystal-panel conveyance apparatus for feeding a plurality of liquid-crystal panels to be laminated with a polarizing sheet having an adhesive layer constituting the continuous web of optical film laminate with predefined slit lines.

FIG. 5 is a flowchart showing manufacturing processes or process steps in the continuous manufacturing system for liquid-crystal display elements in FIG. 4.

FIG. 20 is a table showing a defect inspection unit, types of defect and a defect detection method according to at least one embodiment.

EXPLANATION OF NUMERICAL CHARACTERS

The following numerical characters are used throughout the description to refer to the following features

Figure 11:
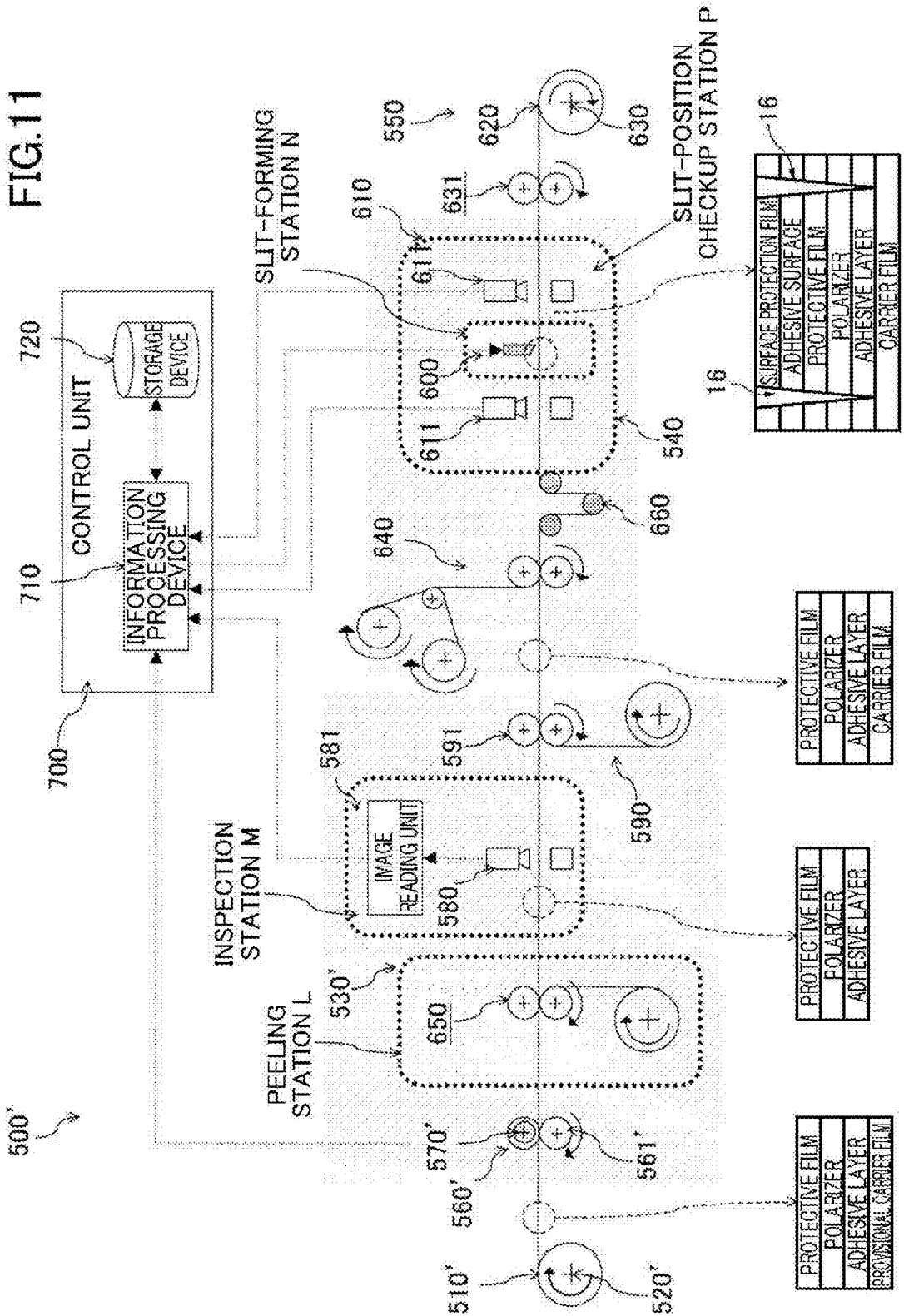
FIG. 11 is a schematic diagram showing a manufacturing method and system for a continuous web of an optical film laminate with predefined slit lines, according to at least one embodiment.

| | |
|---|---|
| 1: | continuous manufacturing system for liquid-crystal element |
| 5: | polarizing sheet |
| 6: | optically functional film sheet |
| 10: | optical film laminate with predefined slit lines |
| 11: | polarizing composite film |
| 11": | polarizing composite film without adhesive layer |
| 12: | adhesive layer |
| 13: | carrier film |
| 13': | provisional carrier film |
| 14: | surface-protection film |
| 15: | optical film laminate |
| 15': | provisional optical film laminate |
| 16: | slit line |
| 100: | feed apparatus |
| 110: | support rack |
| 120: | film feed unit including a feed roller |
| 130: | reading unit |
| 140: | speed adjustment unit including a dancer roller |
| 150: | defective-polarizing-sheet removal unit |
| 160: | film feed unit including a feed roller |
| 170: | straight-ahead-posture detection unit |
| 180: | carrier film take-up drive mechanism |
| 190: | panel-edge detection unit |
| 200: | lamination unit |
| 300: | liquid-crystal panel conveyance unit |
| 400: | control unit |
| 410: | information processing device |
| 420: | storage device |
| 500: | manufacturing system for continuous web of optical film laminate with predefined slit lines according to an embodiment |
| 500': | manufacturing system for continuous web of optical film laminate with predefined slit lines according to the embodiment shown in FIG. 11 |
| 510: | polarizer manufacturing line |
| 510': | roll of provisional optical film laminate |
| 520, 520': | protection film manufacturing line |
| 525: | support rack |
| 530: | manufacturing line for polarizing composite film without adhesive layer 11" |
| 530': | manufacturing line for polarizing composite film with adhesive layer |
| 540: | manufacturing line for continuous web of optical film laminate |
| 550: | manufacturing line for continuous web of optical film laminate with predefined slit lines |
| 560: | lamination drive mechanism |
| 560': | film feed drive mechanism |
| 561: | pair of lamination rollers |
| 561': | pair of feed rollers |
| 570, 570': | distance measurement device |
| 580: | inspection unit |
| 590: | carrier film lamination unit |
| 600: | slitting unit |
| 610: | slitting position checkup unit |
| 620: | roll of manufactured continuous web of optical film laminate with predefined slit lines |
| 630: | take-up drive mechanism |
| 640: | lamination unit |
| 650: | provisional carrier film take-up drive mechanism |
| 651: | provisional-carrier-film peeling unit |
| 700: | control unit |
| 710: | information processing device |
| 720: | storage device |
| 800: | manufacturing system for continuous roll of optical film laminate |
| 810: | film feed unit |
| 820: | take-up drive mechanism |
| 830: | the first inspection unit |
| 840: | the second inspection unit |
| 850: | the third inspection unit |
| 860: | carrier film feed unit |
| 870: | surface-protection film feed unit |
| 900: | control unit |
| 910: | information processing device |
| 920: | storage device |

DETAILED DESCRIPTION

In the following detailed description, for purposes of explanation, numerous specific details are set forth in order to provide a thorough understanding of the disclosed embodiments. It will be apparent, however, that the disclosed embodiments may be practiced without these specific details. In other instances, well-known structures and devices are schematically shown in order to simplify the drawing.

Figure 1:
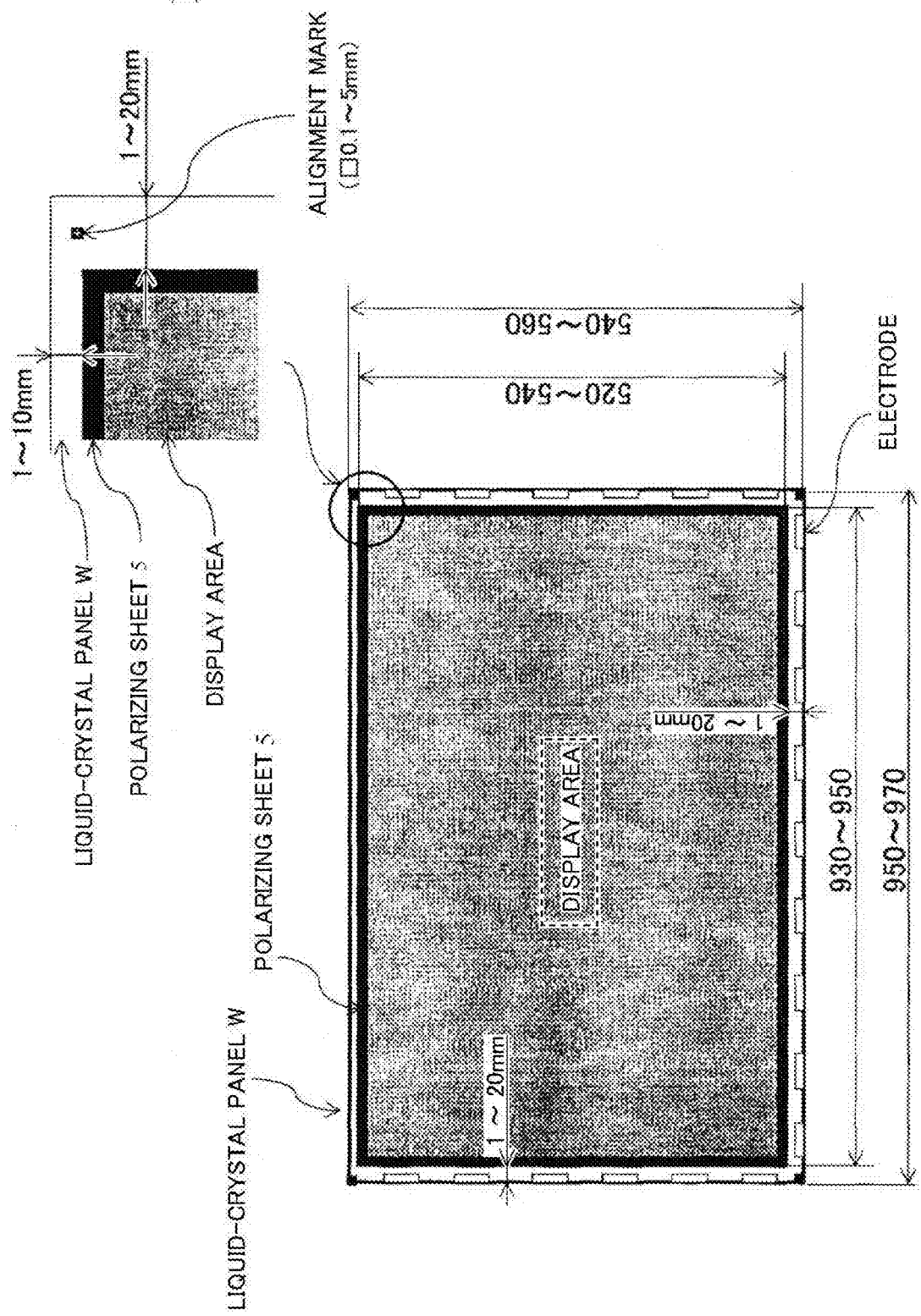
FIG. 1A is a view showing typical example of a liquid-crystal display element for a widescreen television having a diagonal screen size of 42 inches.
FIG. 1B is an enlarged view of a corner of the liquid-crystal display shown in FIG. 1A.
Figure 2:
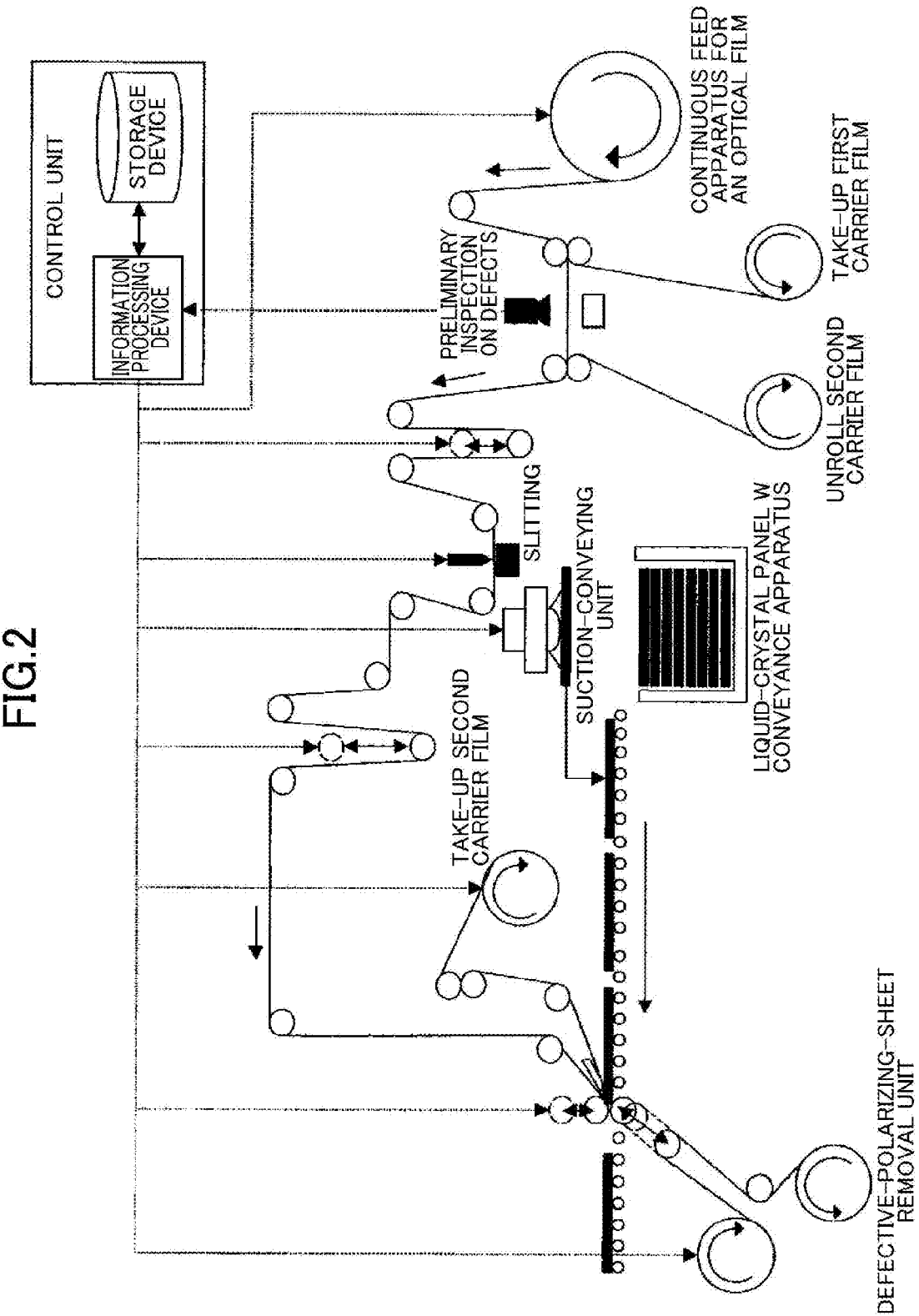
FIG. 2 is a schematic diagram showing a system for continuously manufacturing liquid-crystal display elements wherein defect-free sheets of an optically functional film are formed and laminated on liquid-crystal panels through inspection of defects in the optically functional film, without interrupting the feed of the continuous web of the optically functional film being fed.

Taking a widescreen television having a diagonal screen size of 42 inches as an example, a liquid-crystal panel W therefore comprises a layered liquid-crystal panel which includes a pair of rectangular-shaped substrates each having a size of about 540 to 560 mm in length×about 950 to 970 mm in width×about 0.7 mm (700 µm) in thickness, and a liquid-crystal layer having a thickness of about 5 µm having a transparent electrode, a color filter etc., and sandwiched between the substrates, by a as shown in FIG. 1. Therefore, the thickness of the liquid-crystal panel W itself is about 1.4 mm (1400 µm). The liquid-crystal display element typically has a polarizing sheet 5, commonly referred to as "a polarizing plate," adhesively applied to each of a front side (viewing side) and a back side (backlight side) thereof.

Although the substrates are usually formed from glass, this disclosure is not limited to glass substrates. Other materials such as plastics or composites made from various glass and plastic materials may be used to form either one or both of the substrates.

The present disclosure will now be described with reference to specific embodiments illustrated in the accompanying drawings.

1. General Description of Continuous Web of Optical Film Laminate with Predefined Slit Lines FIG. 3A shows a continuous web of an optical film laminate 15 and FIG. 3B shows a continuous web of an optical film laminate with predefined slit lines 10 according to one embodiment of the present disclosure, on which optically functional film sheets 6 of polarizing composite films 11 are formed on a carrier film 13. The optically functional film sheets 6 are separated by slit lines 16. The slit lines 16 are formed sequentially in a transverse direction of the continuous web of the optical film laminate. Among the optically functional film sheets being formed in cut-state on the carrier film 13, the optically functional film sheets 6 to be laminated with the liquid-crystal panel W are, as described later, formed by two slit lines 16, one on upstream side and one on downstream side of a defect-free position in an optically functional film that is defined based on defect positions in the optically functional film. FIG. 3C is a schematic diagram showing a liquid-crystal display element manufactured by laminating polarizing sheets 5 that are formed by separating the above mentioned optically functional film sheets 6 from the carrier film 13, to a liquid-crystal panel.

The continuous web of an optical film laminate with predefined slit lines 10 including an optically functional film sheet 6 to be laminated to a liquid-crystal panel W, according to various embodiments, is an optical film laminate with predefined slit lines 10 including a continuous web of an optical film laminate 15 comprised of an polarizing composite film 11 including a polarizer having an adhesive layer 12 provided on the surface of the polarizer which has a transparent protection film laminated thereon and which is to be attached to a liquid-crystal panel W, a carrier film 13 releasably laminated to the adhesive layer 12 and a surface-protection film 14 releasably laminated on the surface of the optically functional film opposite to the surface on which the carrier film 13 is laminated. The optical film laminate with predefined slit lines 10 is formed separately where the polarizing composite film 11 and the surface-protection film 14 on the carrier film 13 are cut integrally along slit lines formed sequentially in the transverse direction of the continuous web of the optical film laminate 15. Hereinafter, unless it is necessary to differentiate from others, the term "optical film with predefined slit lines" will be used to express the optical film laminate with predefined slit lines in various embodiments.

The polarizing composite film 11 is a film, generally including a continuous web of the polarizer, two protection films laminated on respective ones of the opposite surfaces of the continuous web of the polarizer, and an acrylic adhesive layer 12 formed on one side of the polarizer which is to be applied to the liquid-crystal panel W. The carrier film 13 is a film that is releasably laminated to the adhesive layer 12 to provide a function of protecting the exposed side of the exposed adhesive layer 12 of the polarizing composite film 11. The polarizing composite film 11 is formed through the following process, for example. First, a continuous web of a polarizer having a thickness of 20 to 30 µm is formed by subjecting a PVA (polyvinyl alcohol)-based film having a thickness of about 50 to 80 µm to a dyeing treatment using iodine and a cross-linking treatment; and subjecting the resultant PVA-based film to an orientation treatment based on stretching in a lengthwise or widthwise direction thereof. As a result, the iodine complex is oriented in the direction parallel to the stretching direction of the PVA-based film to acquire a property of absorbing a polarized light having a plane of oscillation matching with the orientation of the iodine complex to thereby provide a polarizer having absorption axes in the direction parallel to the stretching direction. Thus, in order to produce a continuous web of a polarizer having an excellent optical property in addition to excellent uniformity and accuracy, it is desirable that the stretching direction of the PVA-based film corresponds to the lengthwise or widthwise directions of the film. Generally, the absorption axis of the polarizer or the optically functional film including such polarizer is parallel to the lengthwise direction of the optically functional film, and the polarizing axis is in the widthwise direction perpendicular to the absorption axis. Then, the protection film is laminated to one or each of the opposite surfaces of the formed continuous web of the polarizer with an adhesive. Finally, on one side of the continuous web of the polarizer with the protection film laminated, the acrylic adhesive layer 12 to be applied to the liquid-crystal panel W is formed. Generally, a transparent TAC (triacetylcellulose)-based film having a thickness of about 40 to 80 µm is often used as the protection film for protecting the continuous web of the polarizer. In the following description, the continuous web of the polarizer may be simply referred to as "polarizer." In addition, unless it is necessary to differentiate, the optically functional film may be simply referred to as "polarizing composite film."

According to the definition of terms in "SEMI (Semiconductor Equipment and Materials International) Draft Document" on polarizing films for flat-panel display elements including liquid-crystal display elements (FPD Polarizing Films), the term corresponding to the "polarizing composite film and layer" constituting a polarizing composite film for use in a liquid-crystal display element is referred to as "films and layer composing polarizing films." Thus, the polarizing composite film 11 in the perspective view at FIG. 3A is interpreted as corresponding to the "film composing polarizing films," so-called a polarizing composite film. Thus, the sheet in the perspective view at FIG. 3C which is formed in a rectangular shape from the polarizing composite film 11, corresponds to "polarizing films," so that it may apply the term "polarizing sheet" to the latter, rather than the commonly called name "polarizing plate." In the following description, a film including a polarizer, a protection film laminated on one or both of opposite surfaces of the polarizer, and an adhesive layer formed on one side of the polarizer to be laminated to a liquid-crystal panel W, will be referred to as "polarizing composite film," and a sheet commonly called by the name "polarizing plate," which is formed in a rectangular shape from the polarizing composite film, will be referred to as "polarizing sheet" or simply "sheet." In addition, when a sheet is formed from an optical film including a polarizing composite film having a surface-protection film and a carrier film attached thereto, and when this sheet has to be distinguished from "a polarizing sheet," the former is referred to as "an optical film sheet," and a sheet formed from the surface-protection film or the carrier film included in the composite film is respectively referred to as "a surface-protection film sheet" or "a carrier film sheet" respectively.

The thickness of the polarizing composite film 11 generally has a thickness of about 110 to 220 µm. The polarizing composite film 11 is generally comprised of a polarizer having a thickness of about 20 to 30 µm, a protection film which thickness may be about 80 to 160 µm when two protection films are laminated on respective ones of opposite surfaces of the polarizer, and an adhesive layer 12 which thickness formed on one side of the polarizer to be laminated to a liquid-crystal panel W is about 10 to 30 µm. The polarizing composite films 11 are laminated to respective ones of the front and back sides of the liquid-crystal panel W with the adhesive layer 12 in such a manner that polarizing axes intersect each other at an angle of 90 degrees. Thus, in manufacturing a liquid-crystal display element for a widescreen television having a diagonal screen size of 42 inch, on an assumption that a thickness of a liquid-crystal panel W itself is about 1400 µm, and since the thickness of the polarizing composite film 11 is in the range of 110 to 220 μm, the liquid-crystal display element itself has an overall thickness of about 1620 to 1840 μm. The thickness of the liquid-crystal display element is still within 2.0 mm or less. In this case, the ratio of the thickness of the liquid-crystal display element to the overall thickness of the liquid-crystal panel W, and the polarizing composite film 11 is about 10:1.5 to 10:3. If use is made of a polarizing composite film 11 having a protection film laminated to only one surface of the polarizer, and an adhesive layer 12 formed on the other surface of the polarizer, from the viewpoint of reducing the thickness of the liquid-crystal display element, the thickness of the polarizing composite film 11 itself can be reduced to 70 to 140 μm, so that an overall thickness of the resultant liquid-crystal display element is reduced to a range of about 1540 to 1680 μm. The ratio of the thickness of the liquid-crystal element to that of the liquid-crystal panel W and the polarizing composite film 11 will be in the range of about 10:1 to 10:2.

A continuous web of an optical film with predefined slit lines 10, according to various embodiments, for use in a liquid-crystal display element has a structure as shown in FIG. 3B. The structure of the optical film with predefined slit lines 10 will be briefly described below, in connection with a manufacturing process thereof. A surface-protection film 14 with an adhesive surface having a thickness of about 60 to 70 μm is releasably laminated to the surface of a polarizing composite film 11 devoid of an adhesive layer, and a carrier film 13 is releasably laminated to an adhesive layer 12 provided on the surface of a polarizing composite film 11 which is to be laminated to the liquid-crystal panel W for providing a function of protecting the adhesive layer 12. Typically, a PET (polyethylene terephthalate)-based film is used for each of the carrier film 13 and the surface-protection film 14. During the manufacturing process of the liquid-crystal display element, the carrier film 13 generally serves as a carrying medium (carrier) for the polarizing composite film, as well as the means to protect the adhesive layer 12, and thus it will hereinafter be referred to as a "carrier film." Both of the carrier film 13 and the surface-protection film 14 are so-called "manufacturing-process materials" which are to be peeled and removed prior to the final stage of the manufacturing process of the liquid-crystal display element to form polarizing sheet 5. Both of the films are to be used for protecting the non-adhesive surface from being soiled or damaged, and also protecting the exposed surface of the adhesive layer, of the polarizing composite film 11, during the manufacturing process of the liquid-crystal display elements.

In the polarizing composite film 11, one of the protection films for protecting the polarizer may be replaced with a phase difference film made of a cycloolefin-based polymer, a TAC-based polymer or the like and having an optical compensation function. It may further be provided as a layer of a transparent substrate, such as a TAC-based substrate, having a polymer material, such as a polyester-based polymer or a polyimide-based polymer applied/arranged thereto and then cured. Further, in the case of a polarizing composite film to be laminated to the backlight side of the liquid-crystal display element, it may be possible to provide an additional function by laminating a brightness enhancement film to the backlight side protection film of the polarizer. In addition, regarding the structure of the polarizing composite film 11, there have been proposed various other variations, such as a technique of laminating a TAC-based film to one of opposite surfaces of the polarizer and laminating a PET film to the other surface of the polarizer.

One of the methods for providing a polarizing composite film without adhesive layer 11" including a polarizer and a protection film laminated on one or both of opposite surfaces of the polarizer devoid of an adhesive layer 12 for attaching to a liquid-crystal panel W comprises a step of laminating a carrier film 13 having a transferable adhesive layer formed thereon, to the surface of the polarizing composite film without adhesive layer 11" to be laminated to the liquid-crystal panel W. A specific transfer technique is as follows. In a manufacturing process of the carrier film 13, the carrier film is subjected to a releasing treatment at the surface which is to be laminated to the polarizing composite film without adhesive layer 11" at the surface of the polarizing composite film without adhesive layer 11" which is to be laminated to the liquid-crystal panel W, and then a solvent containing adhesive is applied to the treated surface and dried to form an adhesive layer on the carrier film 13. Then, the carrier film 13 having the formed adhesive layer is laminated to the polarizing composite film without adhesive layer 11", for example, while feeding out the carrier film 13 and feeding out the polarizing composite film without adhesive layer 11" in the same manner, so that the adhesive layer formed on the carrier film 13 can be transferred to the polarizing composite film without adhesive layer 11", and the adhesive layer is formed. Alternatively, instead of the adhesive layer formed in this manner, the adhesive layer 12 may be formed by directly applying a solvent containing adhesive to the surface of the polarizing composite film without adhesive layer 11" to be laminated to the liquid-crystal panel, and drying the same.

The surface-protection film 14 typically has an adhesive surface. Unlike the adhesive layer 12 on the polarizing composite film 11, the adhesive surface must be peeled from a polarizing sheet 6 of the polarizing composite film 11 together with a surface-protection film 14 (not shown) when the surface-protection film 14 is peeled and removed from the optically functional film sheet 6 during the manufacturing process of the liquid-crystal display elements. The reason is that the surface-protection film 14 which is formed together with the polarizing composite film 11 is adapted for protecting the surface of the polarizing composite film 11 devoid of an adhesive layer 12 from the risk of being soiled or damaged, but not an adhesive surface to be transferred to the surface of the polarizing composite film 11. The perspective view at FIG. 3C shows the state of the polarizing sheet 5 after the surface-protection film 14 is peeled and removed. It should further be noted that, irrespective of whether the polarizing composite film 11 has a surface-protection film laminated thereon, it may be possible to provide the polarizing composite film 11 at the surface of the protection film on the front side of the polarizing composite film with a hard coat treatment for protecting the outermost surface of the liquid-crystal display element, and/or a surface treatment for obtaining an anti-glare effect or the like, such as an anti-glare treatment.

As described above, in the manufacture of VA-type and IPS-type liquid-crystal panels, there is no restriction requiring that the two polarizing sheets are laminated to respective ones of front and rear surfaces of the liquid-crystal panel with the polarization axis of each of the polarizing sheets oriented at 45 degrees oblique with respect to the major or minor side of the liquid-crystal display element, as experienced in the manufacture of TN-type liquid-crystal panels, due to the viewing angle characteristics inherent to the orientation of the liquid-crystal, because the polarization axes of the optically functional films or the polarizing sheets to be laminated to respective ones of front and rear surfaces of the liquid-crystal panel are required to be oriented substantially exactly 0 degree or 90 degrees to the direction of the sides of the liquid-crystal panels which are in different directions each other by 90 degrees. Therefore, in a process for continuously manufacturing liquid-crystal display elements using the VA-type and IPS-type liquid-crystal panels, it becomes possible to carry out the process through steps of separating an optically functional film sheet from a carrier film and continuously laminating the sheet to respective ones of a plurality of liquid-crystal panels, during the feed of the optical film laminate, wherein the optical film laminate comprises a carrier film on which an optically functional film sheet is releasably laminated. In addition, during the feed of the optical film laminate containing the carrier film on which the optically functional film sheet is releasably laminated, if only the sheets determined to be the defect-free, normal polarizing sheets are laminated to respective ones of a plurality of liquid-crystal panels to make liquid-crystal display elements, without interrupting the feed of the optical film laminate, it is possible to obtain enhanced product accuracy and manufacturing speed as well as significantly improved production yield in the manufacture of liquid-crystal display elements.

2. A Continuous Manufacturing System and Method for Liquid-Crystal Display Element (General Description of a Continuous Manufacturing System for Liquid-Crystal Display Elements)

FIG. 4 is a schematic diagram showing a continuous manufacturing system 1 for manufacturing liquid-crystal display elements. The system comprises a feed apparatus 100 for feeding a continuous web of an optical film with predefined slit lines 10. It also comprises a liquid-crystal panel conveyance unit 300 for conveying each of a plurality of liquid-crystal panels W, wherein a continuous web of an optical film with predefined slit lines 10 comprising normal polarizing sheets $x_\alpha$ and defective polarizing sheets $x_\beta$ separated from the normal polarizing sheet of the polarizing film 11 formed by cutting the web along slit lines 16 which are sequentially formed in a transverse direction of the optical film, and a carrier film 13 releasably laminated to an adhesive layer 12 of the polarizing composite film 11 is fed to a lamination station B, and each of the plurality of liquid-crystal panels W to be sequentially laminated with only the normal polarizing sheets $x_\alpha$ 5 which have the carrier film 13 removed are fed in synchronization with the feed of normal polarizing sheets $x_\alpha$.

Figure 6:
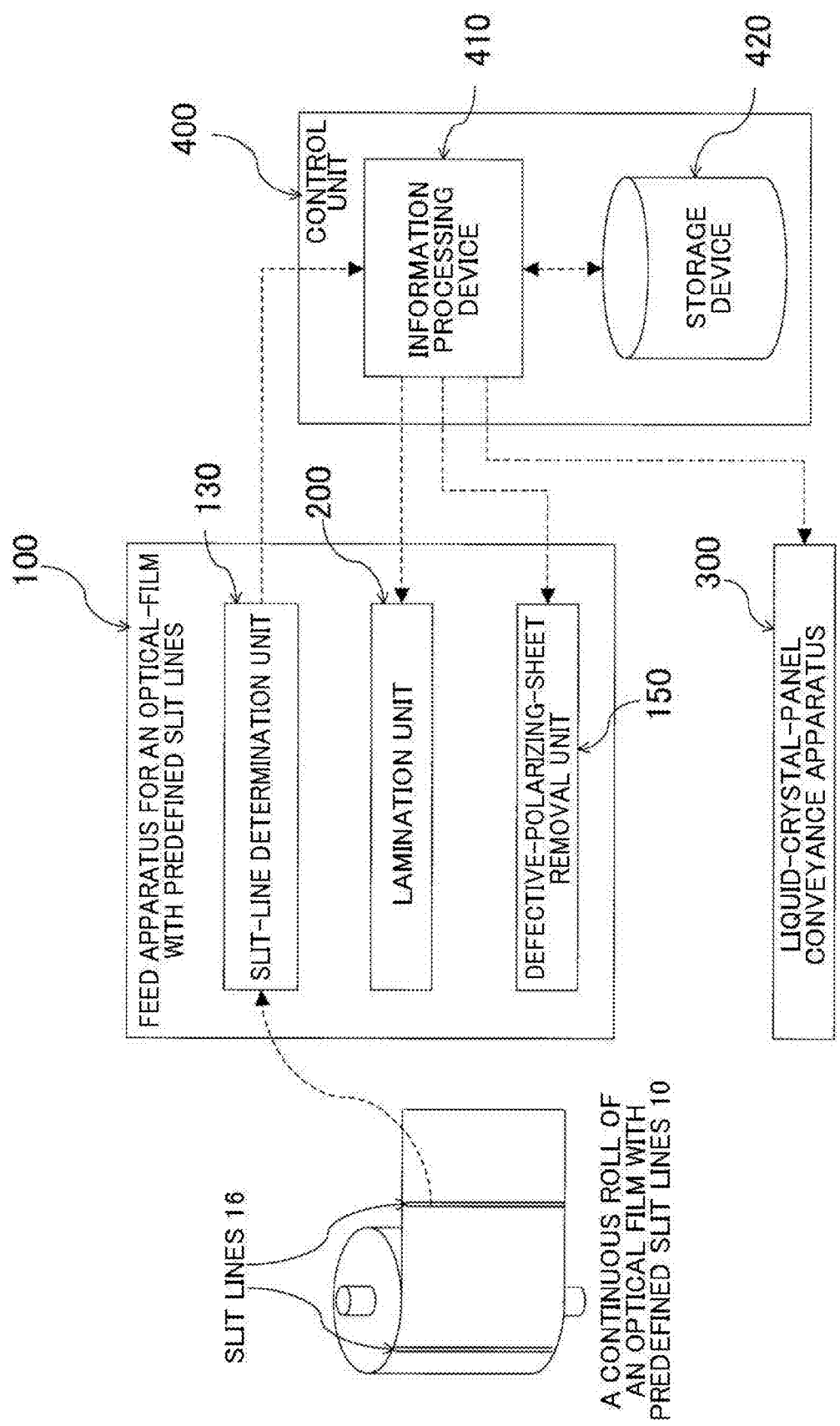
FIG. 6 is a schematic diagram showing the relationship between a control unit for controlling device of the feed apparatus of the continuous web of the optical-film laminate with predefined slit lines and the liquid-crystal-panel conveyance apparatus illustrated in FIG. 4, and information read and imaged by a determination unit in the continuous manufacturing system of the liquid-crystal display element according to at least one embodiment.

FIG. 5 is a flowchart showing a manufacturing process or process steps in the continuous manufacturing system for the liquid-crystal display element shown in FIG. 4. FIG. 6 is a schematic diagram showing the relationship between a control unit 400 for controlling each of the feed apparatus 100 for the continuous web of the optical-film laminate with predefined slit lines 10, the liquid-crystal-panel lamination unit 200 for laminating only the normal polarizing sheet $x_\alpha$ to the liquid-crystal panel, the liquid-crystal panel conveyance unit 300, and information read and imaged by a reading unit 130 from the slit lines 16 sequentially formed on the continuous web of the optical film with predefined slit lines 10, in the continuous manufacturing system of the liquid-crystal display element according to various embodiments.

The feed apparatus 100 for feeding a continuous web of an optical-film with predefined slit lines 10 comprises a support rack 110 for rotatably mounting a continuous roll of a continuous web of an optical film with predefined slit lines 10 according to one embodiment of the present disclosure, as shown in FIG. 4, a film feed unit including a feed roller 120, a reading unit 130 for determining whether each of the polarizing composite film sheets 6 formed separately on the carrier film 13 by cutting the web along slit lines 16 sequentially formed in a widthwise direction with respect to the feed direction of the continuous web of the optical film 10 being fed, is a normal polarizing sheet $x_\alpha$ or a defective polarizing sheet $x_\beta$, in connection with the control unit 400 at a determination station A, a speed adjustment unit including a dancer roller 140 for providing a constant speed film feeding, a defective-polarizing-sheet removal unit 150 provided at a removal station C, for peeling and removing a slit defective polarizing sheet $x_\beta$ from the carrier film 13 by operating a movable roller 152 in connection with the control unit 400, a film feed unit including a feed roller 160, a lamination unit 200 provided at a lamination station B, for peeling the normal polarizing sheets $x_\alpha$ from the carrier film 13 which are formed separately from other sheets by cutting the web along slit lines 16 sequentially formed in a widthwise direction on the carrier film, and laminating each of the normal polarizing sheets $x_\alpha$ to respective ones of the liquid-crystal panels W by operating a pair of lamination rollers at least adapted to be moved toward and away from each other in connection with the control unit 400, a carrier-film take-up drive mechanism 180 for taking up the carrier film 13, a panel-edge detection unit 190 for detecting a leading edge of the normal polarizing sheet $x_\alpha$ provided at the lamination station B and an straight-ahead-posture detection unit 170 for measuring deviations of the normal polarizing sheet $x\alpha$ in the feed direction and the transverse direction formed on the carrier film 13, for example, by taking images of the sheet using the CCD camera and subjecting the taken images to an image processing, whereby the measured deviations are calculated in terms of x, y and θ.

(Composition of the Continuous Web of Optical Film with Predefined Slit Lines)

The continuous web of the optical film with predefined slit lines 10 according to various embodiments provided in the feed apparatus 100 has a width corresponding to a length of a long or short side of a liquid-crystal panel to which it is applied. As shown in FIG. 3A, a film having a transparent protection film laminated on one or each of the opposite surfaces of the polarizer is used for the polarizing composite film 11 that comprises the continuous web of the optical film laminate 15 before forming slit lines. As shown in FIG. 3B, the continuous web of the optical film with predefined slit lines 10 comprises a continuous web of the optical film with predefined slit lines comprising a continuous web of an optical film laminate 15 comprised of a polarizing composite film 11 including a polarizer having an adhesive layer 12 provided on the surface of the polarizer which has a transparent protection film laminated thereon and which is to be attached to a liquid-crystal panel W, and a carrier film 13 releasably laminated on the adhesive layer 12, and optically functional film sheet 6 are formed separately on the carrier film 13 by cutting the web along slit lines 16 which are sequentially formed in a transverse direction of the optical film laminate 15. FIG. 3C is a schematic diagram showing a liquid-crystal display element in which two polarizing sheets 5 peeled from the carrier film 13 are applied to the opposite sides the liquid-crystal panel W with their polarization axes crossed at 90 degrees crossing angle. As shown in FIG. 3A and FIG. 3B, a continuous web of an optical film laminate 15 wherein a surface-protection film 14 having an adhesive layer is additionally releasably laminated on the surface of the polarizing composite film opposite to the surface on which the carrier film 13 is laminated, can be used to make a continuous web of an optical film with predefined slit lines wherein the polarizing composite film 11 and the surface-protection film 14 sheet on the carrier film 13 are cut integrally, if necessary.

The carrier film 13 primarily is a releasable film adapted to protect the adhesive layer 12 of the polarizing composite film 11 during the manufacturing of a continuous web of an optical film with predefined slit lines and of liquid-crystal display elements. Therefore, the carrier film is peeled, taken up, and removed from the adhesive layer 12 prior to or during lamination to the liquid-crystal panel W. The carrier film 13, although it is a releasable film, in various embodiments, is a carrying medium (that is, a carrier film) to carry polarizing sheets 6 which are formed separately on the carrier film 13 by cutting the web along slit lines 16 sequentially formed in a transverse direction on the carrier film, to the lamination station B. Thus, the term "carrier film" is used in various embodiments instead of using "releasable film."

The continuous web of optical film with predefined slit lines 10 is manufactured by two methods as follows, and details of manufacturing methods for the continuous web of optical film with predefined slit lines 10 will be described later. Each of the manufacturing methods is outlined as follows. First, a continuous web of a polarizing composite film without adhesive layer 11" is manufactured with a surface-protection film laminated to at least one of the surfaces of the polarizer and is immediately transported to an inspection station M. At the inspection station M, defects in the polarizing composite film without adhesive layer 11" are detected by inspecting the surface and the inside of the transported continuous web of the polarizing composite film without adhesive layer 11". Then, based on the detected positions of defects, information processing is carried out on the continuous web of the polarizing composite film without adhesive layer 11". Thus, on the continuous web of the polarizing composite film 11, a defect-free region ($x_\alpha$) having a predefined length corresponding to the dimension of the liquid-crystal panel W in the longitudinal direction and a defective region ($x_\beta$) including at least one defect and defined as a region having a predefined length which is different from the length of the defect-free region and being defined across the position of the defect, are defined along the widthwise direction with respect to the longitudinal direction of the web.

The slitting unit installed at a slit-forming station N is operated based on the processed information of the defective position to form slits in the transverse direction, each corresponding to the regions defined along the widthwise direction with respect to the longitudinal direction, and sequentially form slit lines on the continuous web of optical film laminate 15 manufactured after the information processing. After information processing at the inspection station M, the carrier film 13 is releasably laminated by the adhesive layer 12 to the continuous web of the polarizing composite film without adhesive layer 11", to manufacture the continuous web of the optical film laminate 15. When necessary, it is possible to manufacture a continuous web of an optical film laminate 15 in which a surface-protection film 14 having an adhesive layer is releasably laminated on the polarizing composite film opposite to the surface on which the carrier film 13 is laminated.

The manufactured continuous web of optical film laminate 15 is then carried to the slit-forming station N. The slitting unit provided at the slit-forming station N forms slit lines 16 that correspond to each of the region defined in the widthwise direction with respect to the longitudinal direction, or the defect-free region ($x_\alpha$) and the defective region ($x_\beta$) on the carried optical film laminate 15, the slit lines are formed sequentially in the transverse direction on the optical film laminate 15 at the side opposite to the carrier film to a depth reaching a surface of the carrier film 13 adjacent to the adhesive layer. Thus, between the two slit lines 16 formed in sequence on the carrier film 13, one on the upstream side and one on the downstream side of the feeding direction, the defect-free sheet and the defective polarizing sheet, or the normal polarizing sheet and the defective polarizing sheet of the polarizing composite film without adhesive layer 11" comprising the surface-protection film 14 are formed separated from each other when necessary. The continuous web of the optical film with predefined slit lines 10 is obtained finally in this manner. This is the first manufacturing method of the continuous web of the optical film with predefined slit lines 10.

The second manufacturing method of the continuous web of the optical film with predefined slit lines 10 is one that uses a continuous web of a provisional optical film laminate 15 that comprises a polarizing composite film 11 having at least an adhesive layer 12 preliminarily provided, and a provisional carrier film 13' that is releasably laminated to the adhesive layer 12. First, the continuous web of the provisional optical film laminate 15' is provided, for example, in the form of a continuous roll and is provided to the manufacturing process. Then, the continuous web of the provisional optical film laminate 15' is fed out from the continuous roll and provided to a peeling station L. At the peeling station L, the provisional carrier film 13' that comprises the fed continuous web of the provisional optical film laminate 15' is peeled from the adhesive layer 12 of the polarizing composite film 11, and thus the polarizing composite film 11 having the adhesive layer 12 is exposed.

The polarizing composite film 11 having the exposed adhesive layer 12 is transported in the form of the continuous web to the inspection station M. At the inspection station M, defects in the continuous web of the polarizing composite film 11 having the adhesive layer are detected by inspecting the surface and the inside of the transported polarizing composite film 11 having the adhesive layer 12. Then, based on the detected positions of defects, information processing is carried out on the continuous web of the polarizing composite film 11 having the adhesive layer 12. Thus, on the continuous web of the polarizing composite film 11 having the adhesive layer 12, a defect-free region ($x_\alpha$) having a predefined length corresponding to the dimension of the liquid-crystal panel W in the longitudinal direction and a defective region ($x_\beta$) including at least one defect and defined as a region having a predefined length which is different from the length of the defect-free region and being defined across the position of the defect, are defined along the widthwise direction with respect to the longitudinal direction of the web. In the first manufacturing method, the defect inspection is carried out on the polarizing composite film without adhesive layer 11" before the adhesive layer 12 is formed, but in the second manufacturing method, the defect inspection is carried out on the polarizing composite film 11 having the adhesive layer 12.

The slitting unit installed at the slit-forming station N is operated based on the processed information of the defective position to form slits in the transverse direction each corresponding to the regions defined along the widthwise direction with respect to the longitudinal direction, and sequentially form slit lines 16 on the continuous web of optical film laminate 15 manufactured after the information processing. After information processing at the inspection station M, the carrier film 13 replaces the peeled provisional carrier film 13' to be releasably laminated to the adhesive layer 12 to manufacture a continuous web of an optical film laminate 15. When necessary, it is possible to manufacture a continuous web of an optical film laminate 15 in which a surface-protection film 14 is releasably laminated on the polarizing composite film opposite to the surface on which the carrier film 13 is laminated.

From hereafter, in both manufacturing methods, the manufactured optical film laminate 15 is fed to the slit-forming station N to finally complete the continuous web of the optical film with predefined slit lines 10. Thus, between the two slit lines 16 formed in sequence on the carrier film 13, one on the upstream side and one on the downstream side of the feeding direction, the defect-free sheets and the defective polarizing sheets of the polarizing composite film 11 comprising the surface-protection film 14, or the normal polarizing sheets $x_\alpha$ and the defective polarizing sheets $x_\beta$ are formed separately in the completed continuous web of the optical film with predefined slit lines, when necessary. A process to manufacture a continuous web of an optical film with predefined slit lines 10 into a continuous roll can be included in both methods, when necessary.

(General Description of Liquid-Crystal Display Element Manufacturing)

The manufacturing method for liquid-crystal display elements using a continuous web of an optical film with predefined slit lines 10 is outlined as following referring to FIGS. 4 and 5. As shown in FIG. 4, a continuous web of an optical film with predefined slit lines 10 is loaded to a support rack 110 in a form, for example, of a continuous roll. As shown by the step 1 in FIG. 5, the optical film with predefined slit lines 10 fed out from the continuous roll is transported to the determination station A where a reading unit 130 having a CCD in connection with the control unit 400 is provided, as shown in FIG. 6.

At the determination station A, the reading unit 130 determines, in connection with the control unit 400, whether the optically functional film sheet 6 being separated on the carrier film 13 formed by cutting the web along the slit lines 16 which are formed in a widthwise direction with respect to the feed direction of the optical film with predefined slit lines 10 are the normal polarizing sheet $x_\alpha$ or the defective polarizing sheet $x_\beta$. The reading unit 130, for example, takes images of the sequentially formed slit lines on the optical film with predefined slit lines 10 and produce picturized images by an optical sensor including a CCD camera. Then, for example, a measurement device including an encoder measures a length in the longitudinal direction of a sheet (x) between the two slit lines, one on upstream side and one on downstream side. As shown by step 2 in FIG. 5, for example, it is possible to determine whether a measured sheet is a normal polarizing sheet $x_\alpha$ or a defective polarizing sheet $x_\beta$ as follows.

Specifically, the information processing is sequentially carried out on the measured length in the longitudinal direction of a sheet (x) in an information processing device 410 and a storage device 420 provided in the control unit 400 as follows:

(1) the first slit line 16 on the continuous web of the optical film with predefined slit lines 10 that is fed out from the continuous roll is determined in terms of differences in contrasts in the image taken by the reading unit 130;

(2) simultaneously, the encoder provided in the feed roller of the film feed unit including a feed roller 120 measures a feed-out distance of the continuous web of the optical film with predefined slit lines 10;

(3) the next slit line is determined as in the above (1) and the fed length between the two slit lines 16, i.e., a length of a sheet (x) is calculated and stored;

(4) then, when, for example, a length of a sheet (x) is determined to be different from the predefined length ($x_\alpha$) of a preliminarily stored normal polarizing sheet $x_\alpha$, i.e., when the length of a sheet (x) is determined to be shorter or longer than the predefined length ($x_\alpha$) of a preliminarily stored normal polarizing sheet $x_\alpha$, then the sheet is determined to be a defective polarizing sheet $x_\beta$. When the length of a sheet (x) is determined to be equal to the predefined length ($x_\alpha$) of a preliminarily stored normal polarizing sheet $x_\alpha$, i.e., when both have equal length, the sheet is determined to be a normal polarizing sheet $x_\alpha$; and (5) the control unit 400 stores each of the determined positions of normal polarizing sheets $x_\alpha$ and defective polarizing sheets $x_\beta$ in the storage device 420 in terms of, for example, a feed-out distance from the reference point recorded on the continuous web of the optical film 10 with predefined slit lines.

When a defective sheet $x_\beta$ on the carrier film 13 is transported to the removal station C, as shown by steps 3 to 6 in FIG. 5, the control unit 400 sends an instruction to remove the defective polarizing sheet $x_\beta$ based on the stored position information of the defective polarizing sheet $x_\beta$ and operates the defective-polarizing-sheet removal unit 150 including a movable roller, by controlling the operations of the speed adjustment unit including a dancer roller 140 for providing a constant speed film feeding and the feed unit including a feed roller 160 in an inter-related manner. The defective-polarizing-sheet removal unit 150, as shown by step 7 in FIG. 5, peels and removes only the sheets determined to be the defective polarizing sheets $x_\beta$ from the carrier film 13 among the optically functional film sheets 6 being formed separately in sequence on the carrier film 13.

As shown by steps 8 to 10 in FIG. 5, at the removal station C, the continuous web of the optical film with predefined slit lines 10 with the defective polarizing sheet $x_\beta$ removed from the carrier film 13 includes only the normal polarizing sheets $x_\alpha$ in cut-state between the two slit lines 16 on the carrier film 13 one on upstream side and one on downstream side on the carrier film 13, and is transported to the lamination station B by the film feed unit including the feed roller 160 and a carrier-film take up drive mechanism 180 for taking up the carrier film in connection with the control unit 400. At that moment, the straight-ahead-posture detection unit 170 checks whether the feeding direction and widthwise direction of the normal polarizing sheets $x_\alpha$ being formed on the carrier film 13 matches with the reference line.

Figure 9:
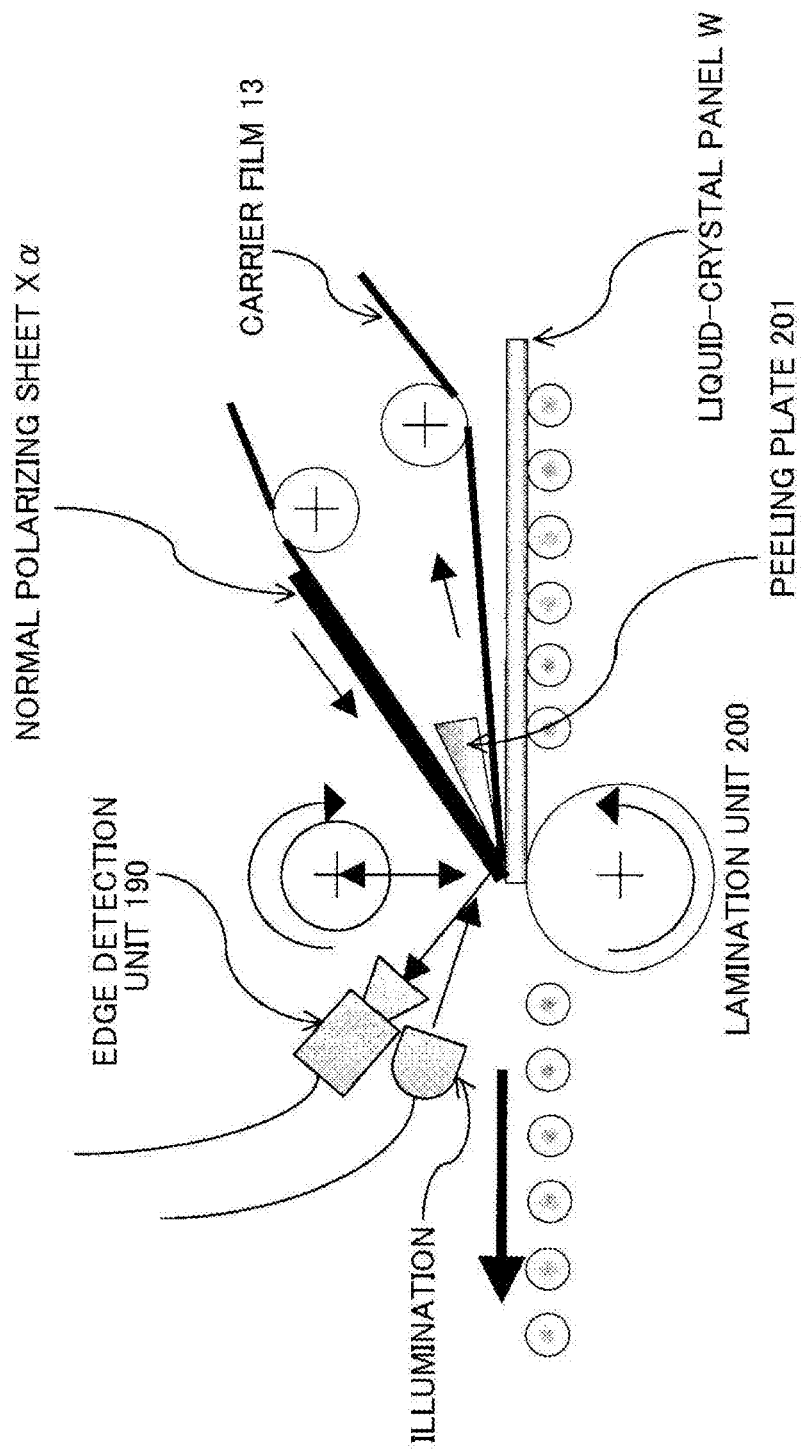
FIG. 9 is a schematic diagram showing a lamination unit with liquid-crystal panels comprising a sheet-edge detection unit for detecting a leading edge of a normal polarizing sheet of a polarizing composite film constituting the continuous web of optical film laminate with predefined slit lines.

As shown in FIG. 9, only the carrier film 13 is peeled by being bent at an acute angle, via the peeling plate 211, by the carrier-film take-up drive mechanism 180. By having the carrier film 13 peeled by being bent at an acute angle, the adhesive layer of the normal polarizing sheets $x_\alpha$ may be gradually exposed. The leading edge of the normal polarizing sheet $x_\alpha$, as being gradually peeled from the carrier film 13, is detected by the panel-edge detection unit 190. Preferably, the normal polarizing sheets $x_\alpha$, while being gradually peeled, is transported to the lamination unit 200 at the lamination station B after the feeding speed the sheets is adjusted to the speed of the lamination with the liquid-crystal panel W. This makes it possible to slightly expose the leading edge of the normal polarizing sheet $x_\alpha$ to allow the leading edge of the liquid-crystal panel W sequentially conveyed to this edge position to be aligned with the leading edge of the normal polarizing sheet $x_\alpha$. The details of the liquid-crystal panel conveyance unit 300, shown by steps 11 to 16 in FIG. 5, will be described later.

(Operation of the System for Manufacturing Liquid-Crystal Display Elements)

In operation of the entire continuous manufacturing system 1 for liquid-crystal panels, a continuous web of a roll of a dummy film is first mounted on the continuous manufacturing system 1. The continuous web of the dummy film is unrolled from the continuous roll under tension by means of the control unit 400 including first and second film feed units including feed rollers 120, 160 each including feed rollers and the speed adjustment unit including a dancer roller 140. The continuous web of the dummy film is advanced until its leading edge reaches a position where, under a normal operation, the carrier film 13 is peeled from the normal polarizing sheet $x_\alpha$, the carrier film 13 from which the normal polarizing sheet is peeled is passed through the peeling plate 201 and taken up by the carrier-film take up drive mechanism 180. Then, the trailing end of the continuous web of the dummy film is connected to the leading end of the continuous web of the optical film with predefined slit lines 10, and a supply of the continuous web of the optical film with predefined slit lines is initiated.

(Removal of Defective Polarizing Sheet $x_\beta$)

Figure 7A:
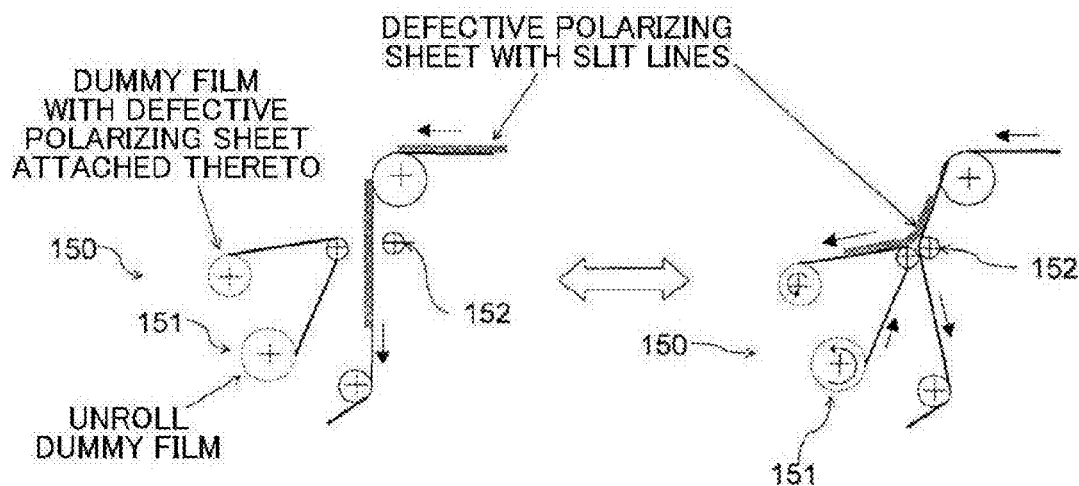
FIGS. 7A and 7B are a schematic diagrams showing a defective-polarizing-sheet removal unit comprising (1) a dummy-film drive mechanism including a movable roller disposed in a feed passage for a continuous web of optical film laminate with predefined slit lines or (2) a dummy-film drive mechanism including a movable roller adapted to be replaced with one of the lamination rollers from a pair of the lamination rollers disposed at lamination station B, according to at least one embodiment.
Figure 7B:
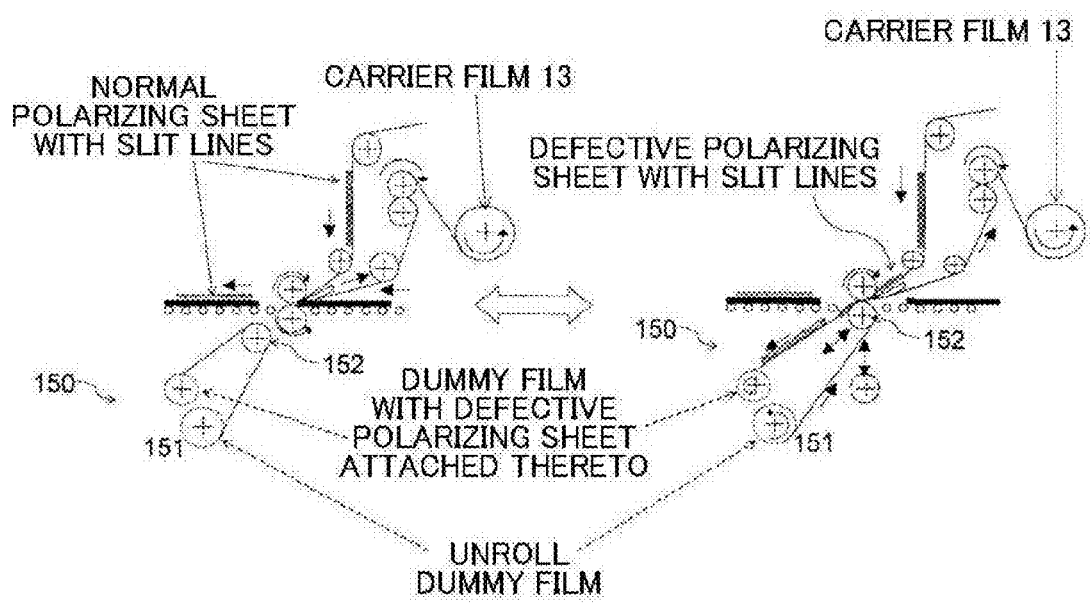

The operation of the defective-polarizing-sheet removal unit 150 in connection with the control unit 400 in the manufacturing process of the liquid-crystal panels is described below. The defective-polarizing-sheet removal unit 150 is operated under the control of the control unit 400. FIGS. 7A and 7B show such defective-sheet removal unit 150 that peels and removes defective polarizing sheets $x_\beta$ from the carrier film 13, which are sheets determined as defective polarizing sheets β by the reading unit 130 among normal polarizing sheets $x_\alpha$ and defective polarizing sheets $x_\beta$ being formed separately on the carrier film 13 included in the continuous web of optical film with predefined slit lines 10. The defective-polarizing-sheet removal unit 150 comprises both of the dummy film drive mechanism 151 and the movable roller 152.

The defective-polarizing-sheet removal unit 150 in FIG. 7A comprises a dummy-film drive mechanism 151 having a function of attaching to thereon and peeling the defective polarizing sheet $x_\beta$ releasably laminated to the carrier film 13 and a movable roller 152 adapted to be activated based on the removal instruction from the control unit 400 when the defective polarizing sheet $x_\beta$ reaches a position in a feed path of the continuous web of the optical film with slit lines 10 where removal of the defective polarizing sheet is to be initiated, and thus the feed path of the continuous web of the optical film with slit lines 10 is moved so that the feed path contacts the dummy-film feed path of the dummy-film drive mechanism 151. Then, the defective polarizing sheet $x_\beta$ on the carrier film 13 is peeled from the carrier film 13 as being attached to the feed path of the dummy film feed path and removed from the feed path of the continuous web of the optical film with predefined slit lines 10. After the defective polarizing sheet $x_\beta$ is removed, the movable roller 152 returns to the original position, and the feed path of the continuous web of the optical film with predefined slit lines 10 and that of the dummy film driven by the dummy film drive mechanism 151 are detached.

The defective-polarizing-sheet removal unit 150 illustrated in FIG. 7B is configured, under control of the control unit 400, to be moved in an inter-related manner with the lamination unit 200 including the pair of lamination rollers provided at the lamination station B. It comprises a dummy-film drive mechanism 151 having a function of releasably attaching and peeling the defective polarizing sheet $x_\beta$, and a movable roller 152 defining a dummy-film feed path of the dummy-film drive mechanism 151. The removal unit illustrated in FIG. 7B is different from the removal unit illustrated in FIG. 7 (1) in that, in the removal unit illustrated in FIG. 7B, the movable roller 152 defining the dummy-film feed path disposed adjacent to the pair of lamination rollers of the lamination unit 200 at the lamination station B is arranged in a replaceable manner with one of the lamination rollers of the pair of lamination rollers in the lamination unit 200.

More specifically, when the defective polarizing sheet $x_\beta$ reaches an end position (i.e., the removal initiation position) of the feed path of the continuous web of the optical film with predefined slit lines, the pair of lamination rollers are moved apart from each other, and the movable roller 152 defining the dummy film feed path is moved to a nip between the lamination rollers in spaced-apart relation to replace the roller with one of the rollers of the pair of lamination rollers. Thus, the movable roller 152 and the other laminating roller are operated in an inter-related manner. In this instance, the carrier film 13 is taken up by the carrier-film take up drive mechanism 180, and the defective polarizing sheet $x_\beta$ is peeled from the carrier film 13 and the peeled defective polarizing sheet $x_\beta$ is attached to the dummy-film feed path by means of the movable roller 152 operated in an inter-related manner with the other roller of the pair lamination rollers and removed without being laminated to the liquid-crystal panel W. After the defective polarizing sheet $x_\beta$ is removed, the movable roller 152 returns to the original position, and the laminating roller that was replaced by the movable roller returns to the position to be operated in an inter-related manner with the other laminating roller, i.e., the inter-related operation of the defective-polarizing-sheet removal unit 150 and the lamination unit 200 is released. Then, when a normal polarizing sheet $x_\alpha$ on the carrier film 13 reaches to the lamination position, the lamination unit 200 is adapted to make the replaced lamination roller to be operated in an inter-related manner with the other lamination roller, so that the normal polarizing sheet $x_\alpha$ is attached to the liquid-crystal panel.

(Conveyance of Liquid-Crystal Panel W)

A brief description of the liquid-crystal panel conveyance unit 300 for conveying the liquid-crystal panel W to the lamination unit 200, including a pair of laminating rollers adapted to be vertically moved toward and away form each other for laminating the liquid-crystal panel W with the normal polarizing sheet $x_\alpha$ and formed separated on the carrier film 13 of the continuous web of the optical film with predefined slit lines 10, will be given below.

Taking a large size television having a diagonal screen dimension of 42 inches as an example, a rectangular-shaped liquid-crystal panel W has a size of about 540 to 560 mm in length and about 950 to 970 mm in width as shown in FIG. 1. During the manufacture process of liquid-crystal display elements, the liquid-crystal panel W is slightly trimmed along its peripheries during a wiring stage including mounting operations of electronic components. Alternatively, the liquid-crystal panel W may be transported or conveyed with peripheries already trimmed. The liquid-crystal panels W are taken out one-by-one from a magazine containing a large number of liquid-crystal panels, by means of a liquid-crystal-panel supply apparatus, and as shown by steps 11 to 16 in FIG. 5, conveyed through cleaning/polishing stage to the lamination unit 200 at the lamination station B for lamination with respective ones of the normal polarizing sheet $x_\alpha$, by the liquid-crystal panel conveyance unit 300, by being adjusted to equal intervals and a constant transportation speed. The normal polarizing sheet $x_\alpha$ is formed from the continuous web of the optical film with predefined slit lines to have a size slightly less than that of the liquid-crystal panel W.

Figure 8:
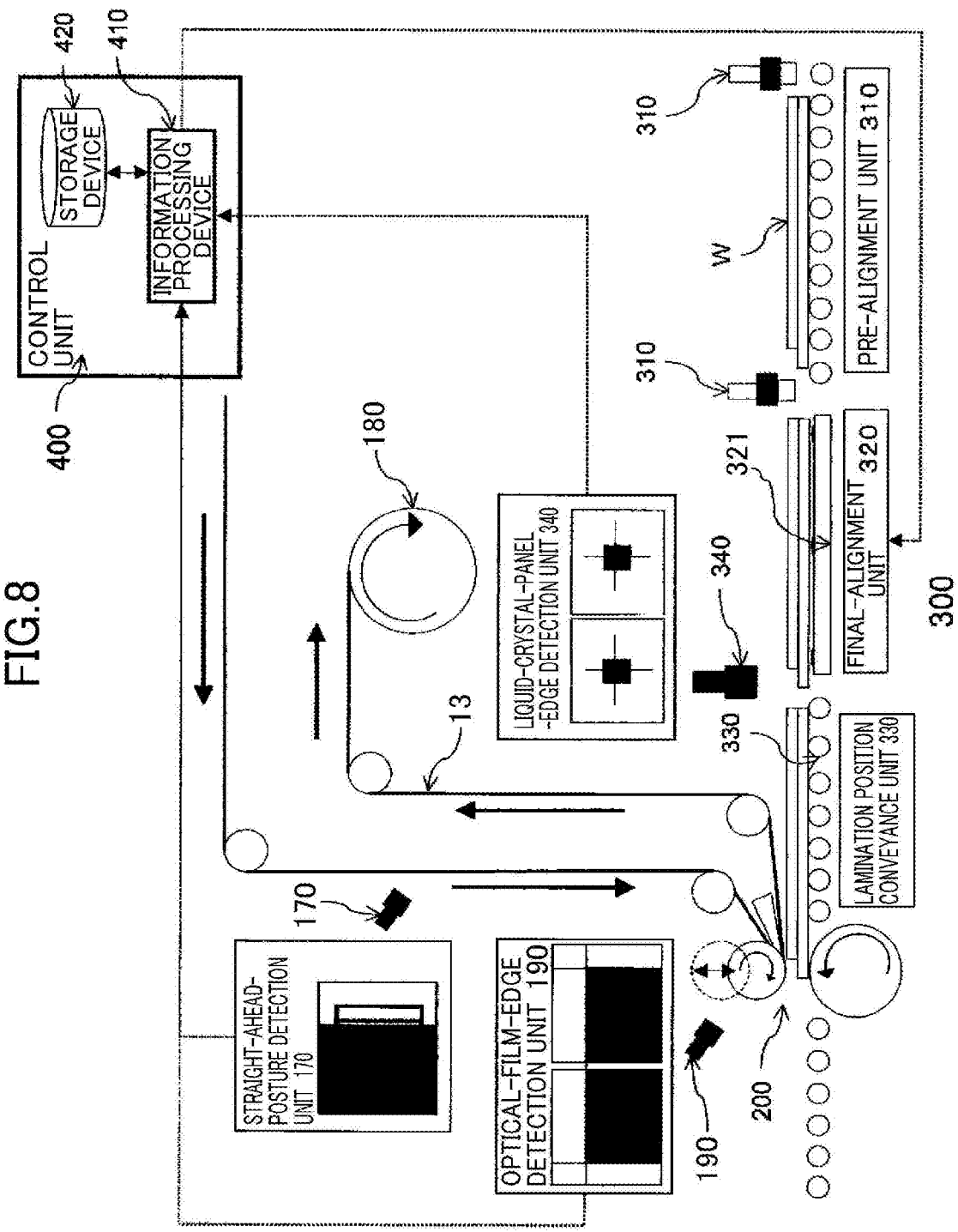
FIG. 8 is a schematic diagram showing the state when a pre-alignment unit, a final-alignment unit, a conveyance unit for conveying the panels to the lamination position and a panel-edge detection unit in the liquid-crystal-panel conveyance apparatus are controlled, based on the information on the sheets determined by the determination unit, to allow a liquid-crystal panel to be conveyed in a controlled posture, in the liquid-crystal display element continuous manufacturing system according to at least one embodiment.

FIG. 8 is a schematic diagram showing, the conveyance of the liquid-crystal panel W in an aligned orientation, by means of the control unit 400 controlling the pre-alignment unit 310, the final-alignment unit 320, the conveyance unit 330 for conveying the panels to the lamination position and the panel-edge detection unit 340 which are provided in the liquid-crystal panel conveyance unit 300, based on the information on the sheet determined by the reading unit 130 as a normal polarizing sheet $x_\alpha$ during the manufacturing process of liquid-crystal display elements. The liquid-crystal panel conveyance unit 300 includes a liquid-crystal panel orientation controlling unit comprising a pre-alignment unit 310, a final-alignment unit 320, a conveyance unit for conveying the panels to the lamination position 330, and a panel-edge-detection unit 340 for detecting the leading edge of the liquid-crystal panel W, for aligning the orientation of the liquid-crystal panel W in a final stage of the conveyance of the liquid-crystal panel W sequentially supplied to the lamination station B when the normal polarizing sheet $x_\alpha$ is transported to the lamination station B, in synchronization with the transportation of the normal polarizing sheet $x_\alpha$.

(Lamination of Normal Sheet $x_\alpha$ to Liquid-Crystal Panel W)

As shown in FIG. 9, the leading edge of the normal polarizing sheet $x_\alpha$ is moved to the nip defined between the pair of lamination rollers of the lamination unit 200 which are now in the vertically spaced apart relation to each other, and detected by the panel-edge detection unit 190. Although the normal polarizing sheet $x_\alpha$ is fed in a state laminated on the carrier film 13, it is seldom that the normal polarizing sheet $x_\alpha$ is accurately fed so that the angle θ between the feed direction and the lengthwise direction of the carrier film 13 becomes zero. Therefore, deviations of the normal polarizing sheet $x_\alpha$ in the feed direction and the transverse direction are measured, for example, by taking images of the sheet using the CCD camera of the straight-ahead-posture detection unit 170 and subjecting the taken images to an image processing, whereby the measured deviations are calculated in terms of x, y and θ, and the calculated data is stored in the storage device 420 by the control unit 400.

The liquid-crystal panels W are sequentially positioned by the pre-alignment unit 310, so that they are aligned in lengthwise and widthwise directions respectively with the transport direction and the direction transverse to the transport direction in the conveyance path. The positioned liquid-crystal panel W is conveyed to and placed on the final-alignment unit 320 which includes an alignment table adapted to be turned by a drive mechanism which is controlled by the control unit 400. The leading edge of the liquid-crystal panel W placed on the alignment table is detected by the panel-edge detection unit 340. The position of the detected leading edge of the liquid-crystal panel W is checked for match with the reference lamination position stored in the storage device, specifically, the calculation data in terms of x, y and θ to represent the orientation of the normal polarizing sheet $x_\alpha$ to be laminated to the liquid-crystal panel W. For example, the deviation between the leading edge of the liquid-crystal panel W and the reference lamination position is measured using an alignment mark of the liquid-crystal panel W illustrated in FIG. 1 to calculate the angular displacement θ, and the alignment table having the liquid-crystal panel W placed thereon is turned by the angular displacement θ. Then, the alignment table is connected to the conveyance unit 330 directed for the lamination unit 200 at the lamination station B. The liquid-crystal panel W is conveyed to the lamination position while keeping the same orientation, by the conveyance unit 330 directed for the lamination unit 200 at the lamination station B. The leading edge of the liquid-crystal panel W is registered with and laid on the leading edge of the normal polarizing sheet $x_\alpha$ at the lamination unit 200, as shown in FIG. 8. In the final stage, the normal polarizing sheet $x_\alpha$ and the liquid-crystal panel W which are in aligned relation with each other and are held between the pair of lamination rollers and conveyed thereby to obtain a finished liquid-crystal display element.

The normal polarizing sheet $x_\alpha$ is fed to the lamination position for lamination with the liquid-crystal panel W together with the carrier film 13 within the continuous web of the optical film with predefine slit lines 10 advanced under tension. The normal polarizing sheet $x_\alpha$ can be gradually peeled from the carrier film 13, so that there is least possibility that the periphery of the normal polarizing sheet $x_\alpha$ is bent or sagged as shown in FIG. 9. This makes it easy to have the orientation of the liquid-crystal panel W aligned with the normal polarizing sheet $x_\alpha$. Such method and system increases the manufacturing speed of the liquid-crystal display element and improves the product accuracy which has not been unachievable in the manufacturing process utilizing the individualized sheets, the process utilizing the individualized sheets to complete a liquid-crystal display element includes steps of; after peeling a separator from each of the individualized sheets to expose the adhesive layer and feeding under a vacuum suction each of the sheets to a lamination position, adjusting the position of the sheet with respect to the liquid-crystal panel W and laminating the sheet to the liquid-crystal panel W.

In addition, the polarizing composite film 11 constituting a continuous web of an optical film laminate 15 used for a continuous web of an optical film with predefined slit lines 10 may be made of a polarizer including a substrate of a PVA based material having at least one surface laminated with a protection film, preferably of a transparent material, with an adhesive layer 12 provided on the other surface. A continuous web of a carrier film 13 is releasably attached to the adhesive layer 12. In the conventional liquid-crystal display element manufacturing process using individualized sheets, generally, a sheet comprising a polarizer having two protection films laminated thereon at the opposite surfaces to impart stiffness to it is used as the polarizing composite film 11 as described above. However, in a liquid-crystal display element manufacturing process using the continuous web of the optical film with predefined slit lines 10 in accordance with various embodiments, the normal polarizing sheet $x_\alpha$ of the polarizing composite film 11 is separately and continuously formed on the carrier film 13 so that the continuous normal polarizing sheet $x_\alpha$ is peeled continuously from the carrier film and sequentially laminated to the liquid-crystal panel W at the lamination unit 200 in the lamination station B. Then the normal polarizing sheet $x_\alpha$ may come out gradually. It is understood that there is no need to peel the separator on a sheet-by-sheet basis as in the manufacturing process using the individualized sheets. When the normal polarizing sheet $x_\alpha$ is peeled from the carrier film 13, the leading edge of the normal polarizing sheet $x_\alpha$ is continuously registered with the leading edge of a corresponding one of a plurality of liquid-crystal panels W being sequentially conveyed on a sheet-by-sheet basis toward the lamination position, and then, the normal polarizing sheet $x_\alpha$ and the corresponding liquid-crystal panel W are laminated together by being pressed against each other by a pair of lamination rollers of the lamination unit 200. In this process, there is no risk that the periphery of the normal polarizing sheet $x_\alpha$ is bowed or warped since the sheet gradually comes out. Thus, differently from the individualized sheet, in the polarizing composite film 11 included in the continuous web of the optical film with predefined slit lines 10 in various embodiments, the protection film may be laminated to only one of the surfaces of the polarizer.

3. Manufacturing Method and System for Continuous Web of Optical Film Laminate with Predefined Slit Lines The best mode for carrying out the disclosure for continuous web of optical film laminate with predefined slit lines for use in a system sequentially manufacturing liquid-crystal display elements by laminating each of a plurality of optically functional film sheets to each of a plurality of liquid-crystal panels, the optically functional film being formed to have a predefined dimension corresponding to a dimension of the liquid-crystal panel having a predefined size, and the manufacturing method and system will be described below with reference to the related figures. In the following description, an optical film laminate with predefined slit lines will be referred to as "optical film with predefined slit lines" and an optically functional film will be referred to as "polarizing composite film."

Figure 10:
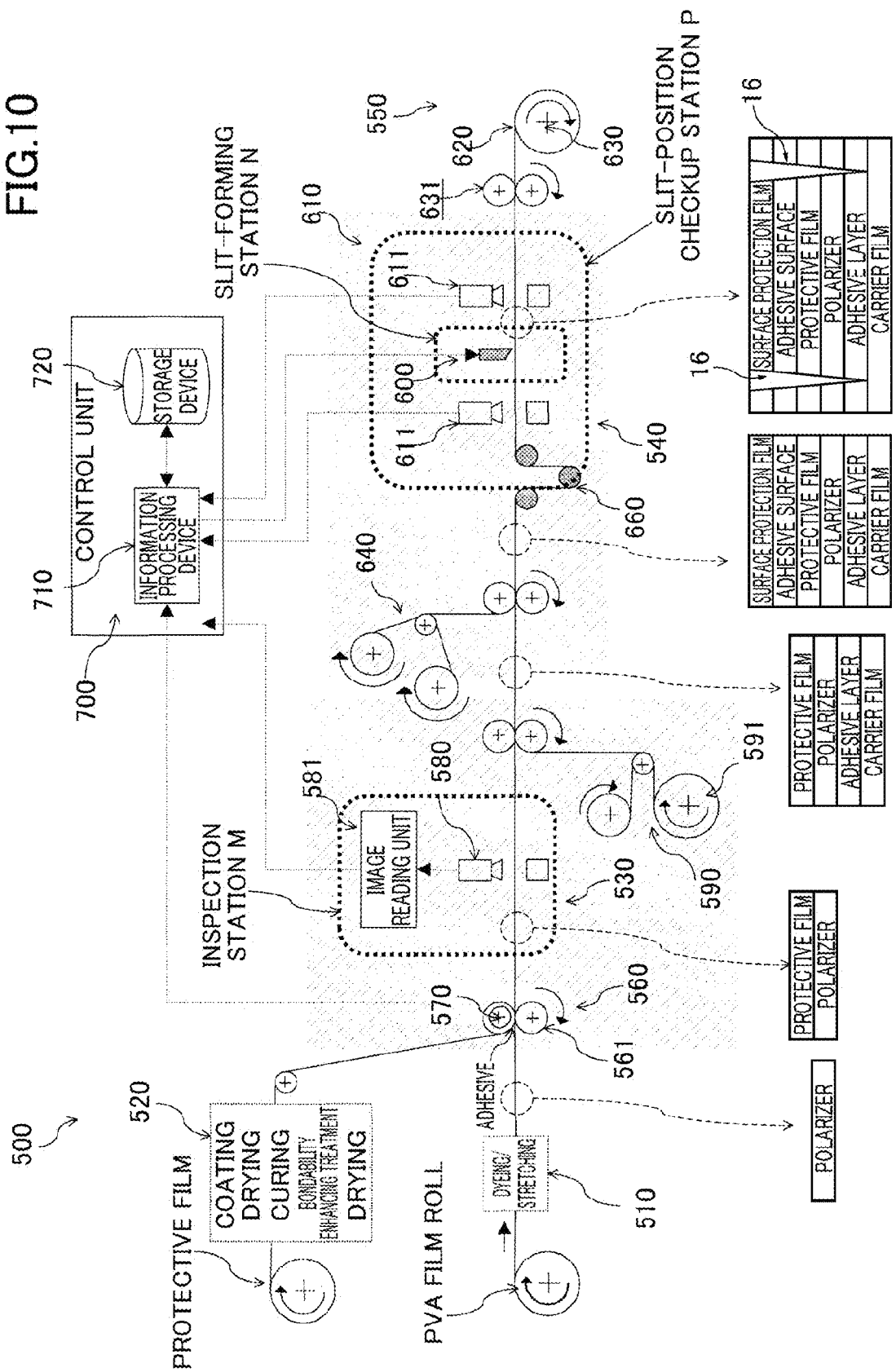
FIG. 10 is a schematic diagram showing a manufacturing method and system for a continuous web of an optical film laminate with predefined slit lines, according to at least one embodiment.
Figure 12:
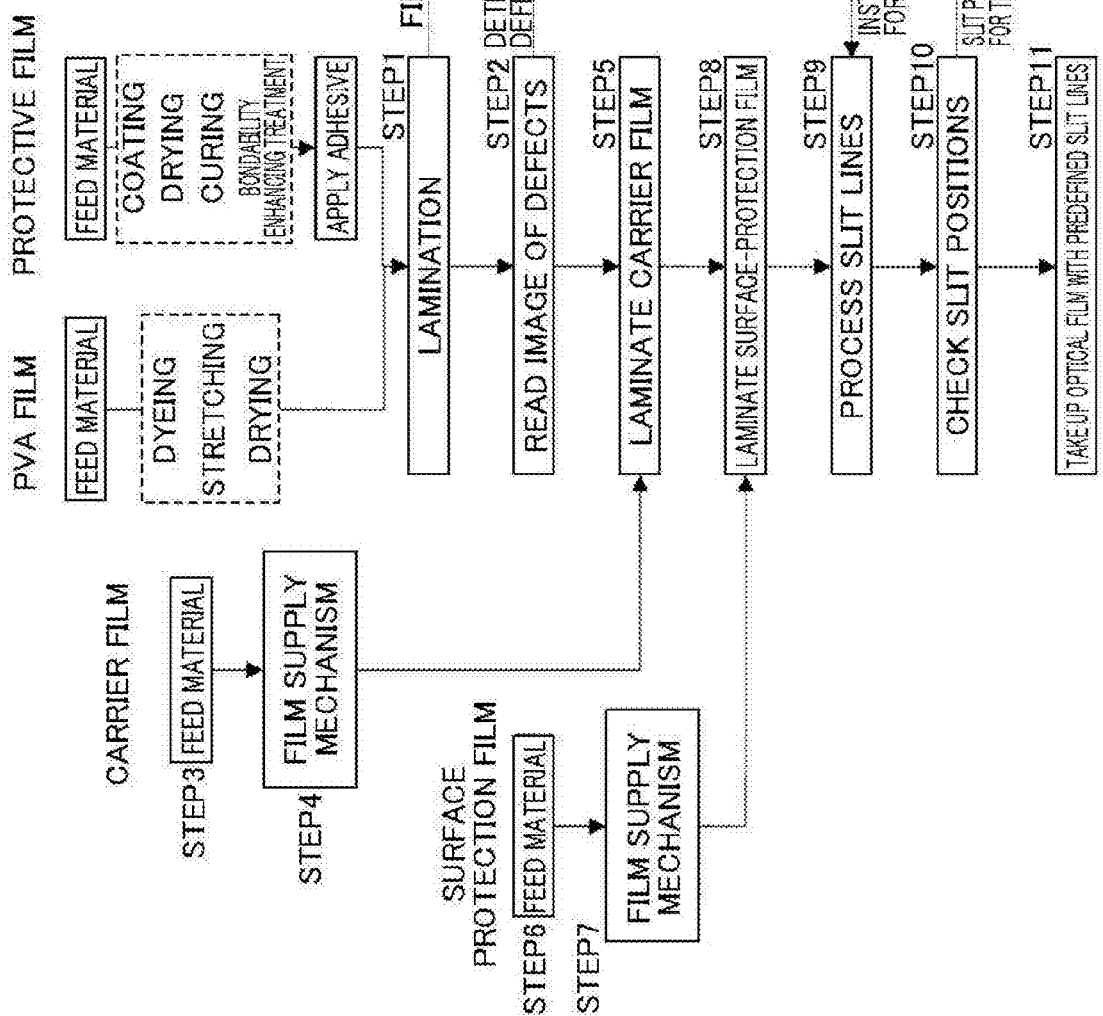
FIG. 12 is a flowchart showing manufacturing processes or process steps in the manufacturing method and system for a continuous web of an optical film laminate with predefined slit lines according to at least one embodiment.
Figure 13:
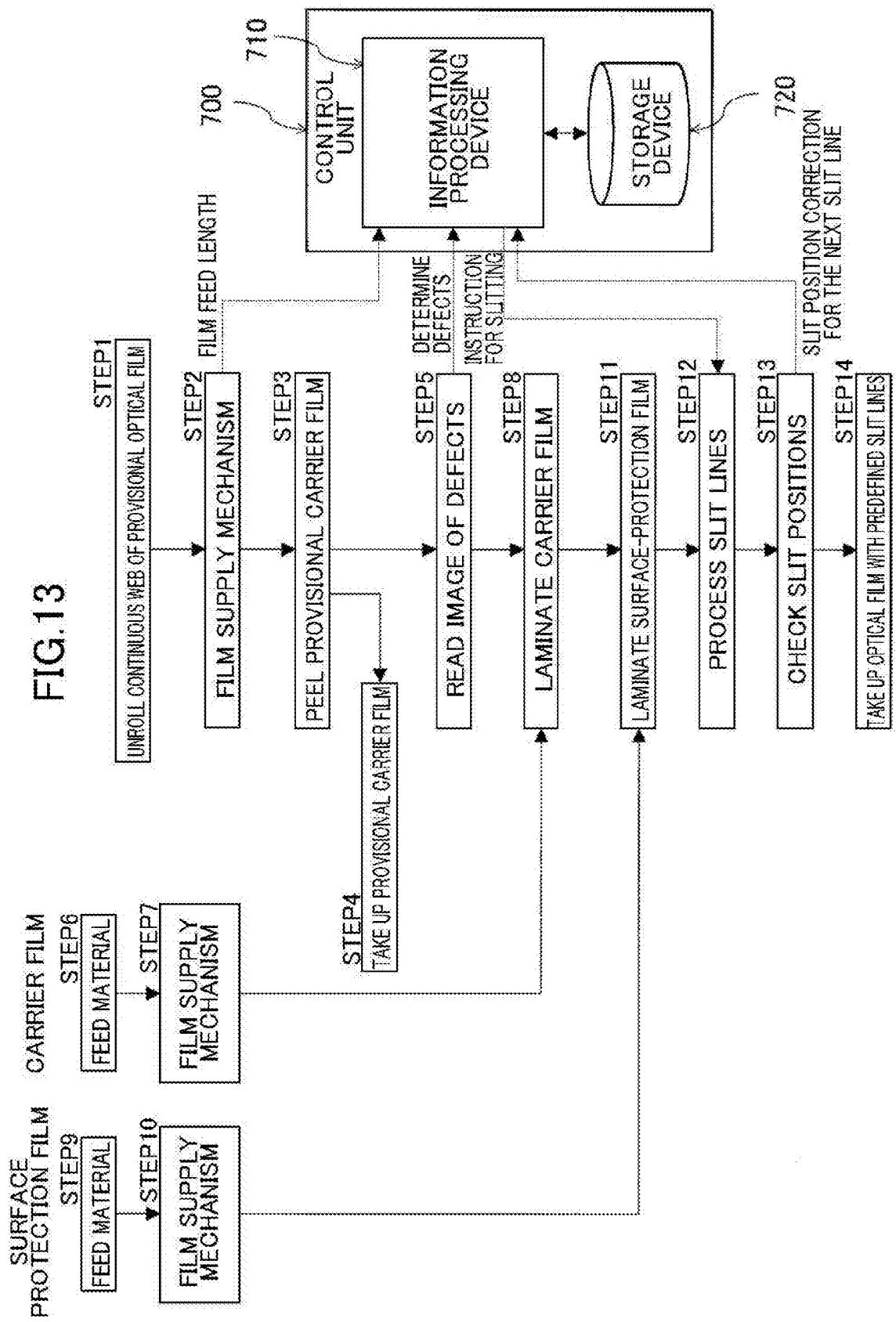
FIG. 13 is a flowchart showing manufacturing processes or process steps in the manufacturing method and system for a continuous web of an optical film laminate with predefined slit lines according to at least one embodiment.

FIGS. 10 and 11 are schematic diagrams showing manufacturing methods and systems for a continuous web of an optical film with predefined slit lines 10, according to the embodiments shown in FIGS. 10 and 11 of the present disclosure. FIGS. 12 to 13 are flowcharts showing respective manufacturing processes or process steps in the manufacturing methods and systems for a continuous web of an optical film with predefined slit lines 10, according to the embodiments shown in FIGS. 10 and 11 of the present disclosure.

Description will now be made on the manufacturing method and system for the continuous web of an optical-film with predefined slit lines, according to the embodiments shown in FIGS. 10 and 11, taking references to FIGS. 10 and 12, and FIGS. 11 and 13, respectively.

(Manufacturing Method and System of Continuous Web of Optical Film with Predefined Slit Lines According to an Embodiment)

FIG. 10 is a schematic diagram of the system 500 including the following manufacturing line. The system 500 comprises a polarizer manufacturing line 510 for producing a continuous web of a polarizer (hereinafter referred to as "polarizer" as in the previous description), a protection film manufacturing line 520 for producing a protection film to be laminated on the polarizer, and a polarizing composite film manufacturing line 530 for producing a continuous web of a polarizing composite film without adhesive layer 11" consisting of the polarizer and the protection film laminated thereon (hereinafter referred to as "polarizing composite film without adhesive layer 11" to distinguish it from the polarizing composite film 11 having an adhesive layer). The manufacturing line 530 further comprises an inspection station M for the polarizing composite film without adhesive layer 11" which inspects surfaces and inside of the polarizing composite film without adhesive layer 11" to detect position of a defect or defects existing in the polarizing composite film without adhesive layer 11".

The manufacturing system 500 further comprises a manufacturing line 540 for producing a continuous web of an optical film laminate 15 by releasably laminating the carrier film 13 and the surface-protection film 14 on the inspected polarizing composite film without adhesive layer 11". The manufacturing line 540 further comprises a slit-forming station N that makes slits in the transverse direction of the continuous web of the optical film laminate 15 each corresponding to the defect-free region ($x_\alpha$) and the defective region ($x_\beta$) defined along the widthwise direction with respect to the predetermined longitudinal direction of the polarizing composite film without adhesive layer 11" and sequentially forms slit lines 16 on the continuous web of the optical film laminate 15, and a slit-position checkup station P that checks the position of slit lines 16 formed on the continuous web of the optical film laminate 15 at the position aligned with the position of slit-forming station N. The manufacturing system 500 may also comprise, at a final stage, a manufacturing line 550 for taking up the manufactured continuous web of the optical film with slit lines 10 into a continuous roll.

FIG. 12 is a flowchart showing the manufacturing processes or process steps in the manufacturing system 500. The manufacturing system 500 comprises manufacturing processes or process steps shown in FIG. 12 between the manufacturing line 530 for laminating a surface-protection film to one of the surfaces of the polarizer to produce a continuous web of a polarizing composite film without adhesive layer 11", and the manufacturing line 550 for taking up the manufactured continuous web of the optical film with predefined slit lines 10 into a continuous roll of manufactured continuous web of optical film laminate with predefined slit lines 620.

The polarizer manufacturing line 510 has a roll of PVA-based film which constitute the substrate of the polarizer and is mounted thereon in a rotatable manner, and includes a sub-line for subjecting the PVA-based film being unrolled from the roll by means of a lamination drive mechanism 560 or other drive mechanism (not shown), processes of dyeing, cross-linking, stretching and then drying. The protection film manufacturing line 520 has rotatably mounted thereon a continuous roll of a typically transparent TAC-based film constituting a substrate of the protection film, and includes a sub-line for subjecting the transparent TAC-based film being unrolled from the continuous roll by means of a lamination drive mechanism 560 or other drive mechanism (not shown), to a saponifying treatment followed by drying. In the case where two protective films are laminated on the opposite surfaces of the polarizer, the present manufacturing system 500 will include two protection film manufacturing lines 520, 520' (description of the protection film manufacturing line 520' is omitted in the drawing). Further, the protective film manufacturing line 520 may additionally include a treatment sub-line for, before a protection film is laminated to the polarizer, subjecting the surface of the protection film to a hard coat treatment and/or an anti-dazzling or anti-glare treatment.

The polarizing composite film without adhesive layer 11" manufacturing line 530 includes a sub-line for applying an adhesive consisting primarily of a polyvinyl alcohol-based resin to an interface between the polarizer and the protection film, and drying the adhesive to bond them together through an adhesive layer having a thickness of only several μm. The manufacturing line 530 further comprises the lamination drive mechanism 560 including a pair of lamination rollers 561, and in one of the pair of lamination rollers 561, a length or distance measurement device 570 having an encoder incorporated therein is provided, and includes a measurement process measuring a fed-out distance of the polarizing composite film without adhesive layer 11" fed out from the lamination drive mechanism 560 by means of the distance measurement device 570.

The manufacturing line 530 comprises the inspection station M and it includes an inspection process for detecting defects in the polarizing composite film without adhesive layer 11" by inspecting the surface and inside of the transported continuous web of the polarizing composite film without adhesive layer 11". As described in detail later, at the inspection station M, the control unit 700, connected with the inspection unit 580, executes information processing, wherein the control unit operates the information processing device 710 and the storage device 720 to determine and store the defect-free region ($x_\alpha$) having a predetermined length in a longitudinal direction and the defective region ($x_\beta$) including at least one defect and defined as a region having a predefined length which is different from the length of the defect-free region, the length of the defective region being defined across the position of the defect, the defect-free region ($x_\alpha$) and the defective region ($x_\beta$) being defined along the widthwise direction with respect to the longitudinal direction of the polarizing composite film without adhesive layer 11" based on the position of a defect or defects existing in and detected through a preliminary inspection, and when a continuous web of an optical film laminate 15 is manufactured, executes information processing to produce slit-position information for sequentially forming slit lines 16 in the transverse direction on a continuous web of an optical film laminate 15, the slit lines corresponding to the stored defect-free region ($x_\alpha$) and defective region ($x_\beta$) using the slitting unit 600 provided in the slit-forming station N. The following is an outline of information processing in manufacturing the continuous web of the optical film with predefined slit lines 10 wherein the control unit 700 operates to produce polarizing sheets in sequence on the carrier film 13 composing the continuous web of the optical film laminate 15 based on slit-position information generated by the information processing.

The control unit 700 functions to operate the information processing device 710 and the storage device 720 to process the image data from the image reading device 581 in association with the feed-length measurement data based on the delivered length measured by the length or distance measurement device 570 as a length from the leading edge of the polarizing composite film without adhesive layer 11", so as to produce position data representing locations or coordinate positions of a defect or defects in the polarizing composite film without adhesive layer 11", and the position data being then stored in the storage device 720. Then, the control unit 700 functions, based on the position data on the detected locations of a defect or defects, to define defect-free regions ($x_\alpha$) and defective regions ($x_\beta$) in the polarizing composite film 11. Further, the control unit 700 functions to produce a slit position information for sequentially forming the normal polarizing sheet $x_\alpha$ and defective polarizing sheet $x_\beta$ being separated from the normal polarizing sheet in the polarizing composite film 11 having an adhesive layer, each corresponding to the defect-free region ($x_\alpha$) and the defective region ($x_\beta$) in the defined polarizing composite film without adhesive layer 11", on the carrier film 13 of the continuous web of the optical film laminate 15 to be manufactured in the later process, at the slit-forming station N, using the slitting unit 600. The slit-position information is provided for indicating positions at which respective ones of the slit lines 16 are to be formed in the continuous web of the optical film laminate and is also stored in the storage device 720.

The normal polarizing sheets $x_\alpha$ of the polarizing composite film 11 having the adhesive layer 12, which has a width corresponding to the dimension of the liquid-crystal panel W, and formed by separating along two slit lines, one on the upstream side and one on the downstream side, in the direction transverse to the longitudinal direction, has a predefined length $x_\alpha$ that matches with that of the liquid-crystal panel W. On the contrary, the defective polarizing sheets $x_\beta$ has a length $x_\beta$ having a predefined length x being defined across a defect or defects, more specifically, the upstream one of the two slit lines 16 for the normal polarizing sheet $x_\alpha$ located just upstream of the defective polarizing sheet $x_\beta$ in a feed direction can be used as the downstream one of the two slit lines 16 for the defective polarizing sheet $x_\beta$, so that the defective polarizing sheet $x_\beta$ has a length $x_\beta$ that is determined by the downstream slit line 16 of the defective polarizing sheet $x_\beta$ and the upstream slit line 16 of the defective polarizing sheet $x_\beta$ (this can be used as the slit line corresponding to the downstream slit line 16 of the next normal polarizing sheet $x_\alpha$). Since the length in the feed direction between the downstream slit line of the defective polarizing sheet $x_\beta$ and the nearest location of a defect may not be the same, the length $x_\beta$ of the defective polarizing sheet varies. Preferably, a calculation algorithm for producing the slit-position information indicating the positions for forming the slit lines is configured such that the length $x_\beta$ of the defective polarizing sheet is different from the length $x_\alpha$ of the normal polarizing sheet $x_\alpha$, i.e., to have a relation $x_\beta \neq x_\alpha$, in any case, as described later in detail. The details of information processing are common in the embodiments shown in FIGS. 10 and 11, and it will be described later in connection with reference to FIG. 15.

The manufacturing line 540 for manufacturing a continuous web of an optical film laminate 15 comprises the following process. The manufacturing process includes a carrier film lamination process in which the carrier film 13 is releasably laminated to the inspected polarizing composite film without adhesive layer 11" by the carrier film lamination unit 590 and a surface-protection film lamination process in which, when necessary, the surface-protection film 14 is releasably laminated to the surface of the polarizing composite film without adhesive layer 11" opposite to the surface on which the carrier film 13 is laminated, by the lamination unit 640.

More specifically, the manufacturing steps are as follows. Referring to the flow chart of FIG. 12, in Step 1, the lamination drive mechanism 560 functions to laminate the protection film to one surface of the polarizer to thereby produce the polarizing composite film without adhesive layer 11" which is then fed while being produced. In Step 2, the manufactured polarizing composite film without adhesive layer 11" is transported to an inspection station M and defects existing in the polarizing composite film without adhesive layer 11" are detected by the inspection unit 580. In step 3, the continuous roll of the carrier film 13 is rotatably mounted on the support rack 591. In step 4, a releasable-film take up drive mechanism 592 and an optical-film take up drive mechanism 630 function to unroll the carrier film 13 from the continuous roll with the transferable adhesive layer 12 in exposed state. In step 5, the carrier film 13 is releasably laminated on the polarizing composite film without adhesive layer 11" through the adhesive layer 12 by the carrier-film lamination unit 590, to form the polarizing composite film 11 having the adhesive layer 12.

Although the descriptions have been made herein with respect to a process wherein the step of forming the adhesive layer 12 on the polarizing composite film without adhesive layer 11", simultaneously with the step of laminating the carrier film 13 on the adhesive layer 12, it is to be understood that the adhesive layer 12 may be preliminarily formed on the polarizing composite film without adhesive layer 11". Further, the adhesive surface of the surface-protection film 14 may be additionally laminated on the surface of the polarizing composite film without adhesive layer 11" opposite to the surface one which the carrier film 13 is laminated by means of the lamination unit 640, irrespective of whether the protection film is subjected to the hard coating treatment or the anti-dazzling or anti-glare treatment, before the protection film is laminated to the polarizer. In this case, the manufactured continuous web of the optical film laminate 15 has a structure having the carrier film 13 and the surface-protection film 14 laminated on respective ones of the opposite surfaces of the polarizing composite film 11.

The manufacturing line 540 includes the slitting station N, and has a process comprising the following steps, wherein, in accordance with the instruction information to sequentially form slit lines 16 in a continuous web of an optical film laminate 15 after information processing at the inspection station M, the slitting unit 600 provided on the slit-forming station N forms slits at a side opposite to the carrier film 13 to a depth reaching the surface of the carrier film adjacent to the adhesive layer of the continuous web of the optical film laminate 15 to form slit lines 16 sequentially, so that the normal polarizing sheet $x_\alpha$ and defective polarizing sheet $x_\beta$ being separated from the normal polarizing sheet of the polarizing composite film 11 having the adhesive layer 12, each corresponding to the defect-free region ($x_\alpha$) and the defective region ($x_\beta$) of the polarizing composite film without adhesive layer 11″ is sequentially formed on the carrier film 13.

The manufacturing line 540 further includes a slit-line check station P, and has processes comprising steps, wherein the slitting position checkup unit 610 that includes two image-reading devices 611, one on upstream of and one on downstream of the slitting unit 600, checks a deviation between the position of the slit line 16 actually formed and the slitting position at which the slit line 16 is to be formed (the reference position) on the continuous web of the optical film laminate 15, and, corrects the slitting position or the angle of the slitting unit 600 if there is a deviation. Details are described with reference to FIG. 14.

Figure 14:
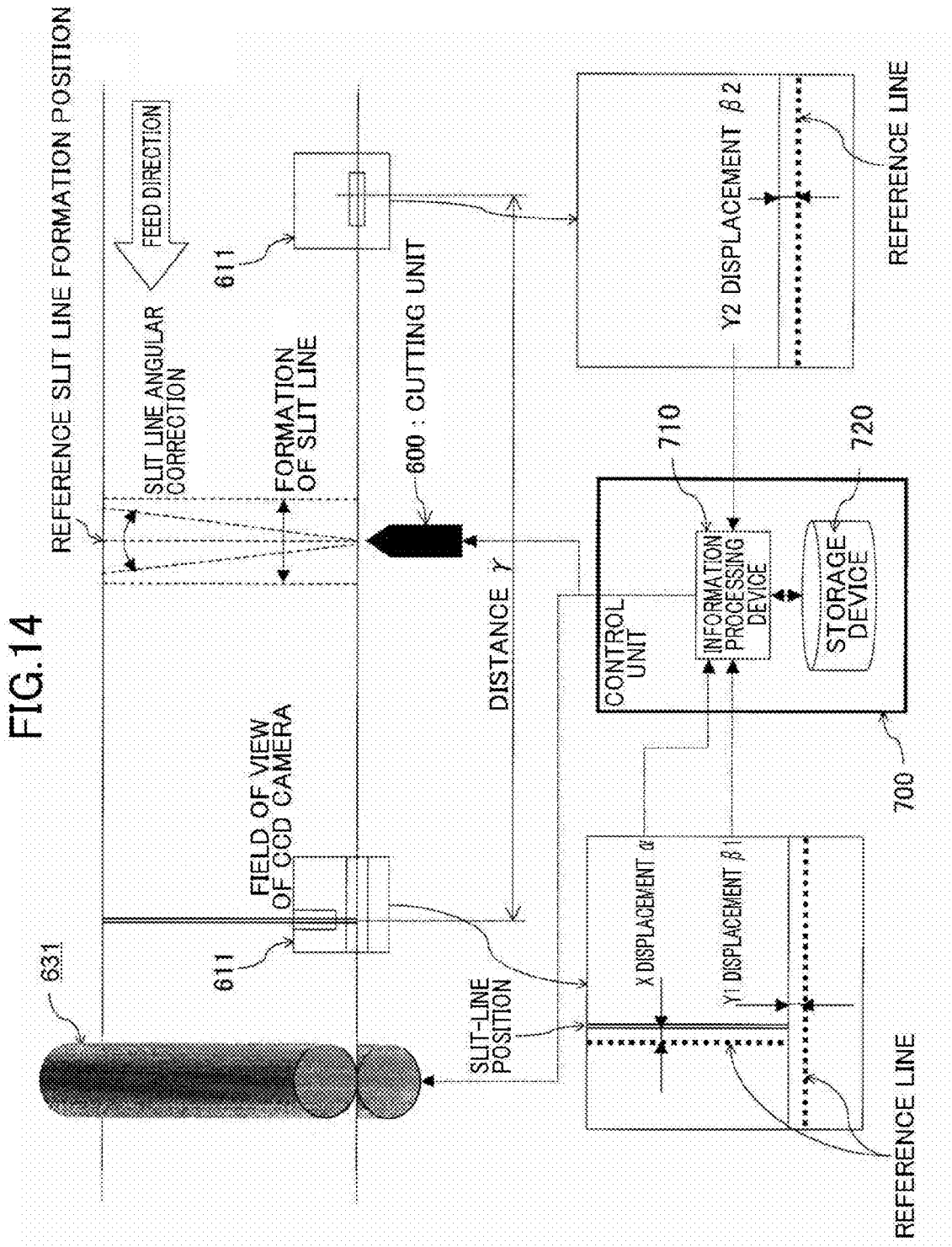
FIG. 14 is a schematic diagram showing the operation of a slitting position checkup unit, together with the inspection method for checking a difference between the position of the slit line actually formed in a direction transverse to a feeding direction and a position at which the slit line is to be formed (position of the reference slit line) on the continuous web of the optical film laminate, the slit line is calculated based on the feed-length measurement data of the fed-out length of the optical film laminate according to at least one embodiment.

FIG. 14 is a schematic diagram showing an operation of the slitting position checkup unit 610 together with the inspection method for checking a deviation between the position of the slit line 16 actually formed in a direction transverse to a feeding direction and a position at which the slit line is to be formed (position of the reference slit line) on the continuous web of the optical film laminate 15, the slit line is calculated based on the feed-length measurement data by a length measurement device 570 in connection with the fed-out length of the optical film laminate 15.

Two image reading devices 611 in the slitting position checkup unit 610 are provided, one on upstream of and one downstream of the slitting unit 600 as seen in the feed direction of the optical film. A pair of feed rollers 631 included in the take-up drive mechanism 630 is disposed at the downstream side of the downstream image reading device 611, and a speed adjustment unit 660 including a dancer roller is disposed at the upstream side of the upstream image reading device 611. By operating the above units in an inter-related manner, the continuous web of the optical film laminate 15 is constantly fed under tension even if it is temporarily stopped at the slitting position.

Coincidence of the position of the slit line 16 actually formed in the direction transverse to the feed direction of the continuous web of the optical film laminate 15 with the position at which the slit line 16 is to be formed (position of the reference slit line) on the continuous web of the optical film laminate 15, the slit line is calculated based on the feed-length measurement data by a distance measurement device 570 in connection with the fed-out length of the optical film laminate 15, can be affirmed by determining the accurate positions in the traveling direction (X direction) and the transverse direction (Y direction) of the optical film laminate 15.

One way is to carry out measurements, at two locations, one on upstream of and one on downstream of the slitting position (the position of the slitting unit 600) where the slit line 16 is to be formed in the optical film laminate 15, for the deviation in X and Y directions on the position where the slit line is actually formed, the position of the edge (the side end) of the optical film laminate 15 and the position where the slit line is to be formed with respect to respective reference lines. For example, the image reading device 611 may be provided with a CCD camera to take images of the position of the actually formed slit lines in the optical film laminate 15 and the position of the edge of the optical film laminate 15 and produce picturized images. The reference lines corresponding to the actually formed slit lines and the position of the edge of the optical film are preliminarily provided in the image-taking regions, and those positions can be determined in terms of differences in contrasts in the taken images. Then, a calculation is made to determine the distance (deviation) between the predetermined reference lines and the positions of the actually formed slit-line and the edge of the optical film, and the location and the angular position of the slitting unit 600 is corrected forwardly or backwardly with respect to the feed direction of the continuous web of the optical film laminate 15, based on the calculated distance (deviation).

More specifically, as shown in FIG. 12, Steps 5 and 9 are performed to feed the continuous web of the optical film laminate 15 under tension, and in step 9, a slit line 16 is formed in the continuous web of the optical film laminate 15. Then, a further step is carried out by the two image reading device 611 to read the position of the actually formed slit line 16 in the continuous web of the optical film laminate 15, and to determine whether there is any deviation between the position of the read slit line 16 of the optical film laminate and the position where the slit line 16 is to be formed based on the slit-position information, and in the case where there is any deviation, Steps 10 and 11 are carried out, and corrected, for example, in the following manner.

The manner of the inspection for determining the deviation between the position of the actually formed slit line 16 of the continuous web of the optical film laminate 15 and the position where the slit line 16 is to be formed is carried out for example in accordance with the following procedures.

(1) Images of the position (X) of the actually formed slit line 16 of the continuous web of the optical film laminate 15 and two positions (Y1, Y2) of the edge of the continuous web of the optical film laminate 15 are taken by the image reading device 611, and the images are picturized for measurement of the position of the actually formed slit line 16 (X) of the continuous web of the optical film laminate 15 and the positions of the edges (Y1, Y2) of the continuous web of the optical film laminate 15 in terms of the differences in contrasts.

(2) There is a slit line reference position in the form of a line extending in Y direction at a position intermediate a reference line extending in Y direction at an upstream position as seen in X direction in the imaging area of one of the image reading devices 611 and another reference line extending in Y direction at a downstream position as seen in X direction in the imaging area of the other of the image reading devices 611, and data γ representing the distance between the upstream and downstream reference lines is preliminarily stored in the storage device 720 via the information processing device 710. Furthermore, there are upstream and downstream reference lines extending in the X direction in respective ones of the image-taking regions of the image reading devices 611.

(3) A correction value α for correcting the position of the slit line 16 to be formed in X direction in accordance with the slit position information, and a correction value δ for angularly correcting the position of the slit line 16 in Y direction are calculated based on the measured positions of the actually formed slit line 16 (X) and the edge (Y1, Y2) of the continuous web of the optical film laminate 15 and the reference lines. The correction value α correspond to the measured deviation α, or the deviation α between the actual slit line 16 position (X) and the downstream side reference line extending in the Y direction. The correction value δ can be calculated according to Equation 1 shown below, based on the deviations in Y direction of the edge of the continuous web of optical film laminate 15 at two positions, or the deviations (β1, β2) of the edge of the continuous web of the optical film laminate with respect to respective ones of the upstream and downstream reference lines extending in the X direction, and the distance data γ between the two reference lines.

$$\delta = \cos^{-1}\left\{\frac{\gamma}{\sqrt{\gamma^2 + (\beta_1 - \beta_2)^2}}\right\}$$ [Equation 1]

(4) The storage device 720 is used to store correction values (α, δ) for applying an instruction to the slitting unit 600 to perform an angular position correction by a value δ and a positional correction by value α in the X direction based on the measured and calculated data so as to make the slit line conform to the reference line of the position where the slit line 16 is to be formed extending in the Y direction.

(5) The slitting unit 600 receives instruction from the control unit 700 for the next operation of forming a slit line 16 in the continuous web of the optical film laminate 15 to perform a positional correction in the feed direction and an angular position correction in a crosswise direction with respect to the feed direction, based on the stored correction values (α, δ) so as to conform to the reference line of the position where the slit line 16 is to be formed in the continuous web of the optical film laminate 15.

(6) Thereafter, the slitting unit 600 operates to form a next slit line in the continuous web of the optical film laminate 15.

The manufacturing line 550 includes a take-up drive mechanism 630 including a pair of feed rollers 631 that winds a continuous web of an optical film with predefined slit lines 10 into a continuous roll of manufactured continuous web of optical film laminate with predefined slit lines 620.

In the embodiment shown in FIG. 10, the polarizing composite film 11 having the adhesive layer 12 may also be manufactured by directly applying a solvent containing an adhesive to the surface of the inspected polarizing composite film without adhesive layer 11" which is to be laminated to the liquid-crystal panel W, then drying the polarizing composite film. However, generally, the polarizing composite film 11 having the adhesive layer 12 is manufactured as follows. In a manufacturing process of the carrier film 13, one surface of the carrier film 13 to be laminated to the surface of the polarizing composite film without adhesive layer 11" that is to be laminated to the liquid-crystal panel W is subjected to a releasing treatment, and then a solvent containing an adhesive is applied to the treated surface and dried to form a carrier film 13 having the adhesive layer 12. In the carrier film lamination process in the manufacturing line 540, the carrier film 13 having the preliminarily formed adhesive layer 12 is laminated to the inspected polarizing composite film without adhesive layer 11" by the carrier film lamination unit 590 so that the adhesive layer 12 formed on the carrier film 13 can be transferred to the inspected polarizing composite film without adhesive layer 11" to produce a polarizing film 11 having the adhesive layer 12. It is understood that the manufacturing line 540 may include a surface-protection film lamination process in which the surface-protection film 14 is laminated to the surface of the inspected polarizing composite film without adhesive layer 11" opposite to the surface on which the carrier film 13 is laminated by the lamination unit 640.

(Manufacturing Method and System of Continuous Web of Optical Film with Predefined Slit Lines According to the Embodiment Shown in FIG. 11)

A feature of the manufacturing system 500' according to the embodiment shown in FIG. 11 is that a preliminarily manufactured continuous web of a provisional optical film laminate 15' is prepared. Thus, the manufacturing system 500' does not comprise a manufacturing line for polarizer or a manufacturing line for a surface-protection film. Also, unlike the manufacturing line 530 in the embodiment shown in FIG. 10, it is not necessary to include a process of applying an adhesive agent to the interface between the polarizer and the protection film, and drying the adhesive to bond them together by the pair of lamination rollers 561 comprised in the lamination drive mechanism 560. An equivalent line to the manufacturing line 530 is the manufacturing line 530' of the continuous web of the provisional optical film laminate 15' as shown in FIG. 11. The line is the same as the step 1 shown in FIG. 13. The manufacturing line 530' comprises a film feed drive mechanism 560' that includes a pair of feed rollers 561' for feeding a continuous roll of provisional optical film laminate 510' mounted on the support rack 525.

FIG. 11 is a schematic diagram showing the manufacturing system 500' that comprises the following manufacturing lines. The units and devices in the manufacturing system 500' shown in FIG. 11 corresponding to those of the manufacturing system 500 shown in FIG. 10 are given the same numbers.

FIG. 13 is a flowchart showing manufacturing processes or process steps in the manufacturing system 500'.

As shown in FIG. 11, the manufacturing line 530' of the provisional optical film laminate 15' feeds a continuous web of the provisional optical film laminate 15' including a provisional carrier film 13' (schematically shown at the bottom of FIG. 11) to the peeling station L, and includes a process of peeling the polarizing composite film 11 having the adhesive layer 12 that comprises the provisional optical film laminate 15' from the provisional carrier film 13' that also comprises the polarizing composite film 11.

The manufacturing line 530' comprises the film feed drive mechanism 560' including a pair of feed rollers 561' and a distance measurement device 570' having an encoder incorporated in one of the lamination rollers, and includes a measurement process to measure a fed-out distance of the continuous web of the provisional optical film laminate 15' from the film feed drive mechanism 560'. The manufacturing line 530' further comprises an inspection station M and includes an inspection process to feed the manufactured polarizing composite film 11 having the adhesive layer 12 to the inspection station M, and inspect defects existing in the polarizing composite film 11 having the adhesive layer 12. The manufacturing of the continuous web of the optical film with predefined slit lines 10 in the embodiment shown in FIG. 11 is commenced by the manufacturing line 530'.

A provisional carrier film 13' having a transferable adhesive layer is used in the manufacturing process of the preliminarily prepared continuous web of the provisional optical film laminate 15'. It is because when the provisional carrier film 13' is peeled from the continuous web of the provisional optical film laminate 15' in the manufacturing system 500', the adhesive layer of the provisional carrier film 13' is transferred to the polarizing composite film 11 to produce the polarizing composite film 11 having the adhesive layer 12.

The manufacturing system 500', as shown in FIG. 11, comprises the manufacturing line 530' for manufacturing the continuous web of the polarizing composite film 11 having the adhesive layer 12. The manufacturing line 530' includes an inspection station M that is similar to the inspection station M included in the manufacturing system 500 in the embodiment shown in FIG. 10, and the inspection station M in manufacturing line 530' is different from the one in the manufacturing system 500 in that the inspection target is the polarizing composite film 11 having the adhesive layer 12. The manufacturing system 500' further comprises the manufacturing line 540 and the manufacturing line 550, as the manufacturing system 500 in the embodiment shown in FIG. 10. Therefore, the manufacturing system 500' comprises the following units and devices that are common in the manufacturing system 500 in the embodiment shown in FIG. 10: an inspection unit 580 that includes an image reading device 581, a carrier film lamination unit 590 that includes a support rack 591 to which a continuous roll of the carrier film 13 is provided, a slitting position checkup unit 610 at a slit-position checkup station P which includes a slitting unit 600 at a slitting station N and two image reading devices 611 one on upstream of and one downstream of the slitting unit 600, a take-up drive mechanism 630 that includes a pair of feed rollers which winds the manufactured continuous web of the optical film with predefined slit lines 10, and a control unit 700 that includes a continuous information processing device 710 and a storage device 720, and also a lamination unit 640 of a surface-protection film when necessary. The unit comprised in the manufacturing system 500' but not in the manufacturing system 500 in the embodiment shown in FIG. 10 is a provisional carrier film take-up drive mechanism 650 that includes the provisional carrier film peeling unit 651 provided in the peeling station L.

The manufacturing system 500' comprises the processes or process steps as shown in FIG. 13. In step 1, a continuous roll of provisional optical film laminate 510' of a provisional optical film laminate 15', as an example, is mounted on a support rack 525. For the provisional optical film laminate 15', a polarizing composite film 11 including a polarizer having a protection film laminated to one or each of opposite surfaces of the polarizer, and a provisional carrier film 13' formed with a transferable adhesive layer 12 and laminated to the polarizing composite film 11 is used as an example. In step 2, the continuous web of the optical film laminate 15' is fed to the manufacturing line 530' for manufacturing the polarizing composite film 11 having an adhesive layer 12 by the film feed drive mechanism 560' that includes a pair of feed rollers 561'. In steps 3 and 4, the provisional carrier film 13' is peeled and removed from the provisional optical film laminate 15' by the provisional-carrier-film peeling unit 651 in the provisional carrier film take-up drive mechanism 650, and the polarizing composite film 11 with the transferred adhesive layer 12 is manufactured. In step 5, the inspection unit 580 inspects surfaces and the inside of the polarizing composite film 11 having the exposed adhesive layer 12, and defect existing in the polarizing composite film 11 is detected in the same manner as in the embodiment shown in FIG. 10.

The control unit 700, connected with the inspection unit 580, at the inspection station M, executes information processing wherein the control unit operates the information processing device 710 and the storage device 720 to determine and store the defect-free region ($x_\alpha$) having a predetermined length in a longitudinal direction and the defective region ($x_\beta$) including at least one defect and defined as a region having a predefined length which is different from the length of the defect-free region, the length of the defective region being defined across the position of the defect, the defect-free region ($x_\alpha$) and the defective region ($x_\beta$) being defined along the widthwise direction with respect to the longitudinal direction of the polarizing composite film 11 having the adhesive layer 12 based on the position of a defect or defects existing in and detected through a preliminary inspection, and when a continuous web of an optical film laminate 15 is manufactured, executes information processing to produce slit-position information for sequentially forming slit lines 16 in the transverse direction on a continuous web of an optical film laminate 15, the slit lines corresponding to the stored defect-free region ($x_\alpha$) and defective region ($x_\beta$) using the slitting unit 600 provided in the slit-forming station N. The following is an outline of information processing in manufacturing the continuous web of the optical film with predefined slit lines 10 wherein the control unit 700 operates to produce polarizing sheets in sequence on the carrier film 13 composing the continuous web of the optical film laminate 15 based on slit-position information generated by the information processing.

Specifically, the control unit 700 functions to operate the information processing device 710 and the storage device 720 to process the image data from the image reading device 581 in association with the feed-length measurement data based on the delivered length measured by the length or distance measurement device 570 as a length from the leading edge of the polarizing composite film 11 having the adhesive layer 12, so as to produce position data representing locations or coordinate positions of a defect or defects in the polarizing composite film 11 having the adhesive layer, and the position data being then stored in the storage device 720. Then, the control unit 700 functions, based on the position data on the detected locations of a defect or defects, to define defect-free regions ($x_\alpha$) and defective regions ($x\beta$) in the polarizing composite film 11 having the adhesive layer 12. The control unit 700 further functions to produce slit position information for sequentially forming normal polarizing sheet $x_\alpha$ and defective polarizing sheet $x_\beta$ being separated from the normal polarizing sheet in the polarizing composite film 11 having an adhesive layer, each corresponding to the defect-free region ($x_\alpha$) and the defective region ($x_\beta$) in the defined polarizing composite film 11 having the adhesive layer 12, on the carrier film 13 of the continuous web of the optical film laminate 15 to be manufactured in the later process, at the slit-forming station N, using the slitting unit 600. The slit-position information is provided for indicating positions at which respective ones of the slit lines 16 are to be formed in the continuous web of the optical film laminate and is also stored in the storage device 720. In any case, the above information processing is the same as the one in the manufacturing system 500 in the embodiment shown in FIG. 10.

The manufacturing line 540 for manufacturing a continuous web of an optical film laminate 15 comprises the following process. The manufacturing process includes a carrier film lamination process in which the carrier film 13 is releasably laminated to the inspected polarizing composite film 11 having the adhesive layer by the carrier film lamination unit 590 and a surface-protection film lamination process in which, when necessary, the surface-protection film 14 is releasably laminated to the surface of the polarizing composite film 11 opposite to the surface on which the carrier film 13 is laminated, by the lamination unit 640. More specifically, the manufacturing steps are as follows. Referring to the flow chart of FIG. 13, in steps 6 to 8, the carrier film 13 is releasably laminated on the polarizing composite film 11 having the adhesive layer 12 by the carrier-film lamination unit 590, wherein the surface of the carrier film 13 to be laminated is subjected to a releasing treatment, to form the continuous web of the optical film laminate 15. The manufactured continuous web of the optical film laminate 15 has the same structure as the continuous web of the optical film laminate 15 manufactured in the manufacturing system 500 in the embodiment shown in FIG. 10.

It may be possible to releasably laminate a surface-protection film 14 having an adhesive surface on the surface of the polarizing composite film 11 opposite to the surface on which the carrier film 13 is laminated by means of a lamination unit 640, before the protection film is laminated to the polarizer, irrespective of whether the protection film is subjected to a hard coat treatment or an anti-dazzling or anti-glare treatment on one surface. In this case, the resulting continuous web of the optical film laminate 15 has a structure where the carrier film 13 and the surface-protection film 14 are releasably laminated to respective ones of the opposite surfaces of the polarizing composite film 11 having the adhesive layer 12.

The manufacturing line 540, as the manufacturing line in the embodiment shown in FIG. 10, includes the slitting station N, and has a process comprising the following steps, wherein, in accordance with the instruction information to sequentially form slit lines 16 in a continuous web of an optical film laminate 15 after information processing at the inspection station M, the slitting unit 600 provided on the slit-forming station N forms slits at the side opposite to the carrier film 13 to a depth reaching the surface of the carrier film adjacent to the adhesive layer of the continuous web of the optical film laminate 15 to form slit lines 16 sequentially, so that the normal polarizing sheet $x_\alpha$ and defective polarizing sheet $x_\beta$ being separated from the normal polarizing sheet of the polarizing composite film 11 having the adhesive layer 12, each corresponding to the defect-free region ($x_\alpha$) and the defective region ($x_\beta$) of the polarizing composite film 11 is sequentially formed on the carrier film 13. The descriptions for each size of the normal polarizing sheet $x_\alpha$ and the defective polarizing sheet $x_\beta$ in the longitudinal direction of the polarizing composite film 11 having the adhesive layer 12 formed by two slit lines, one on the upstream side and one on the downstream side in the widthwise direction with respect to the longitudinal direction and having a predefined length corresponding to the dimension of the liquid-crystal panel W are omitted here as the descriptions are the same as those in the embodiment shown in FIG. 10.

The manufacturing line 540 further includes a slit-line check station P, and has processes comprising steps, wherein the slitting position checkup unit 610 that includes two image-reading devices 611, one on upstream of and one on downstream of the slitting unit 600, checks a deviation between the position of the slit line 16 actually formed and the slitting position at which the slit line 16 is to be formed (the reference position) on the continuous web of the optical film laminate 15, and, corrects the slitting position or the angle of the slitting unit 600 if there is a deviation.

More specifically, as shown in FIG. 13, steps 8 and 12 are performed to feed the continuous web of the optical film laminate 15 under tension, and in step 12, a slit line 16 is formed in the continuous web of the optical film laminate 15. Then, a further step is carried out by the downstream image reading device 611 to read the position of the actually formed slit line 16 in the continuous web of the optical film laminate 15, and to determine whether there is any deviation between the position of the read slit line 16 of the optical film laminate and the position where the slit line 16 is to be formed based on the slit-position information, and in the case where there is any deviation, steps 13 and 14 are carried out. The inspection method for checking a deviation between the position of the slit line 16 actually formed and a position at which the slit line 16 is to be formed on the continuous web of the optical film laminate 15 is omitted here as the description is the same as the detailed description of the process at the slit-line check station P in the embodiment shown in FIG. 10 with reference to FIG. 14.

The manufacturing line 550 is similar to the one in the manufacturing system in the embodiment shown in FIG. 10 and it includes a take-up drive mechanism 630 having a pair of feed rollers 631 to wind a continuous web of an optical film with predefined slit lines 10 into a continuous roll of manufactured continuous web of optical film laminate with predefined slit lines 620. The difference between the manufacturing system in the embodiment shown in FIG. 10 and that in the embodiment shown in FIG. 11 is understood from the film section diagram shown in the bottom of FIGS. 10 and 11.

(Formation of Slit Position Information)

At the inspection station M, both in the first and the embodiment shown in FIG. 11, the control unit 700, connected with the inspection unit 580, executes information processing, wherein the control unit operates the information processing device 710 and the storage device 720 to determine and store the defect-free region ($x_\alpha$) and the defective region ($x_\beta$) including at least one defect and defined as a region having a predefined length which is different from the length of the defect-free region, the length of the defective region being defined across the position of the defect, the defect-free region ($x_\alpha$) and the defective region ($x_\beta$) being defined along the widthwise direction with respect to the respective longitudinal direction of the polarizing composite film without adhesive layer 11" (in the case of the embodiment shown in FIG. 10) or the polarizing composite film 11 having the adhesive layer 12 (in the case of the embodiment shown in FIG. 11) based on the position of a defect or defects existing in and detected through a preliminary inspection, and when a continuous web of an optical film laminate 15 is manufactured in the later process, executes information processing to produce slit-position information for sequentially forming slit lines 16 in the transverse direction on a continuous web of an optical film laminate 15, the slit lines corresponding to the stored defect-free region ($x_\alpha$) and defective region ($x_\beta$) using the slitting unit 600 provided in the slit-forming station N. The control unit 700 operates to produce polarizing sheets in sequence on the carrier film 13 composing the continuous web of the optical film laminate 15 based on slit-position information generated by the information processing to manufacture the continuous web of the optical film with predefined slit lines 10.

The steps to form slit line position information that determines positions of defect-free region ($x_\alpha$) and defective region ($x_\beta$) being defined in the transverse direction with respect to the longitudinal direction is described below with reference to the schematic diagram in FIG. 15 and flowcharts in FIGS. 16 to 18. It is understood that these embodiments are only examples.

Figure 15:
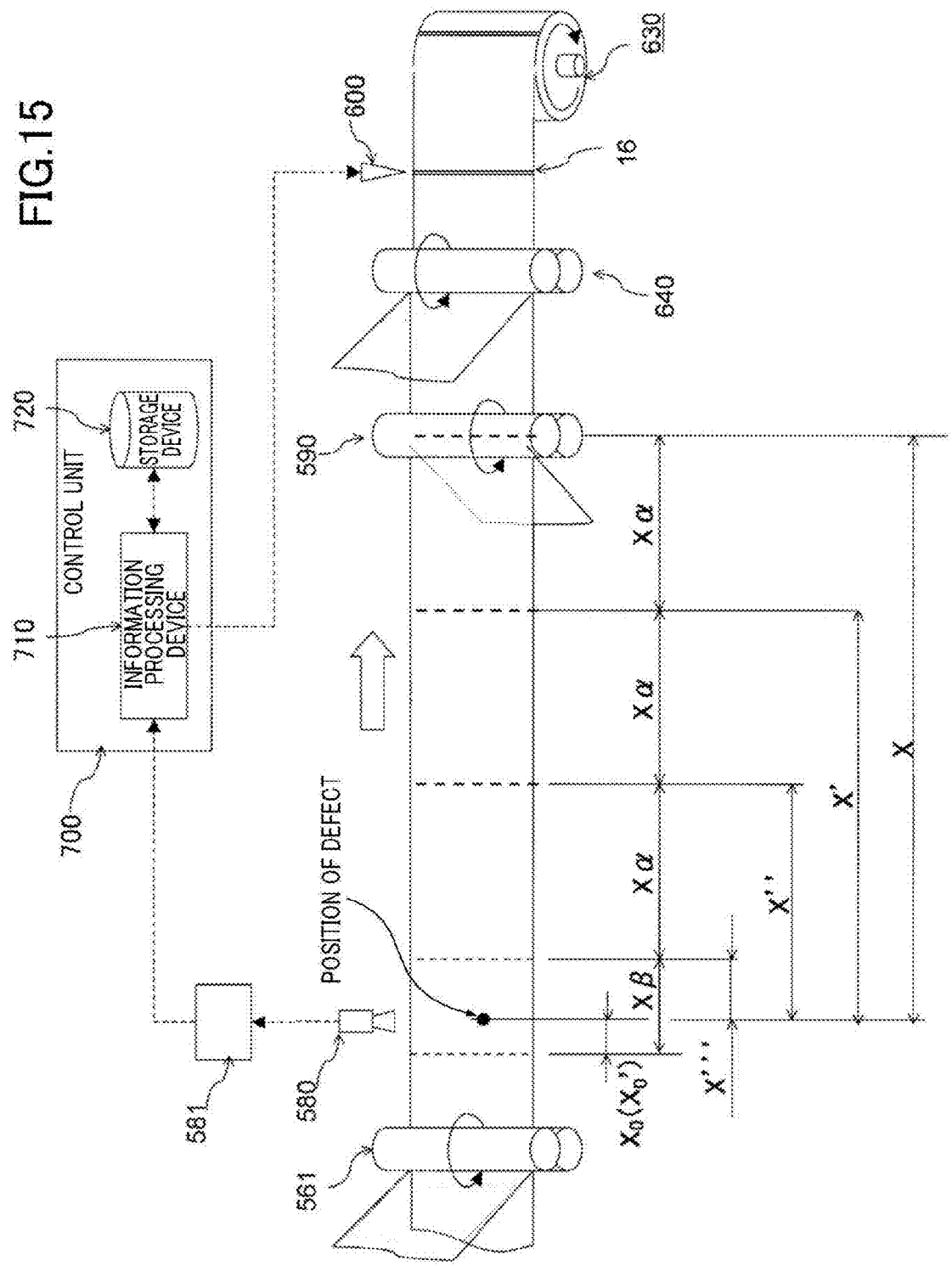
FIG. 15 is a schematic diagram showing a technique of calculating a position for forming a slit line in a continuous web of an optical film laminate to segment a region of a polarizing composite film into a defective region and a defect-free region according to at least one embodiment.

FIG. 15 is a schematic diagram showing the feed of the polarizing composite film without adhesive layer 11" to which a surface-protection film is laminated on its polarizer or the polarizing composite film without adhesive layer 11" having the adhesive layer 12 (hereinafter, both are called polarizing composite film 11) transported continuously in the right direction by means of the lamination drive mechanism 560 or the film feed drive mechanism 560' and the pair of feed rollers 631 included in take-up drive mechanism 630, via the feed roller of the carrier film lamination unit 590 and the speed adjustment device (not shown) that includes a dancer roller.

Figure 16:
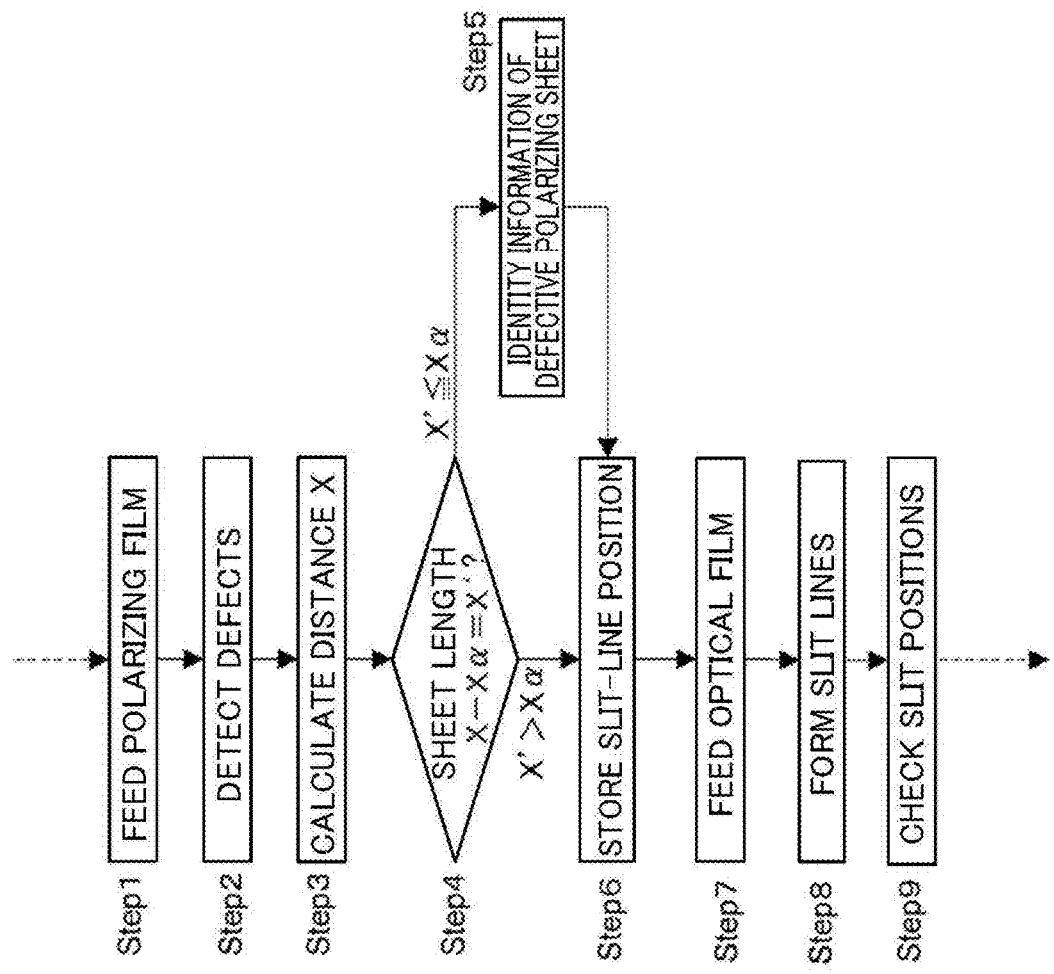
FIG. 16 is a flowchart showing a step to form slit line in a technique of storing defect identification information $x_\gamma$ according to at least one embodiment.
Figure 17:
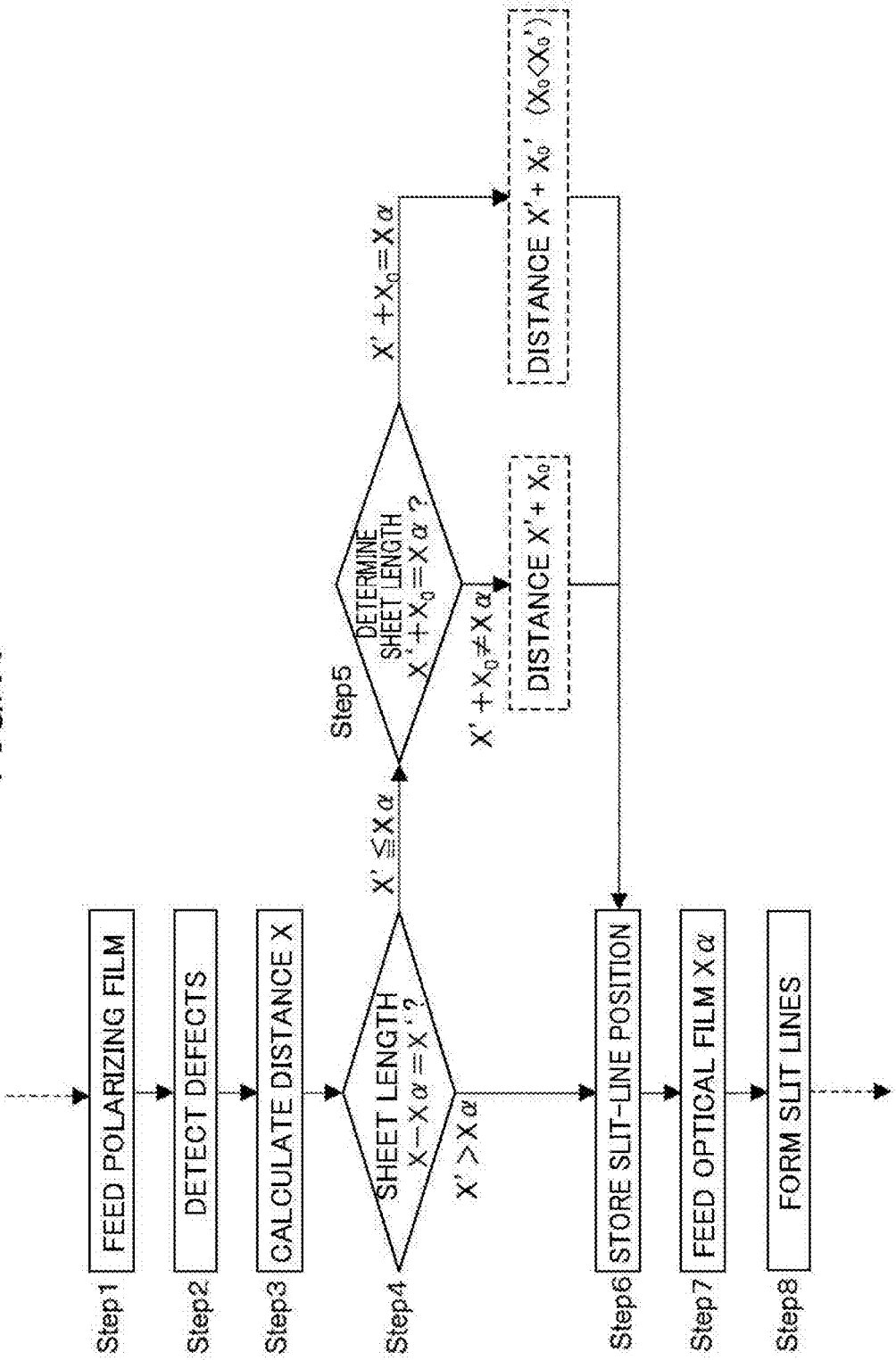
FIG. 17 is a flowchart showing a step to form a slit line in a technique of modifying a distance to a next-slit-line formation position to $(x'+x_0')$ wherein $x_0'>x_0$, according to at least one embodiment.
Figure 18:
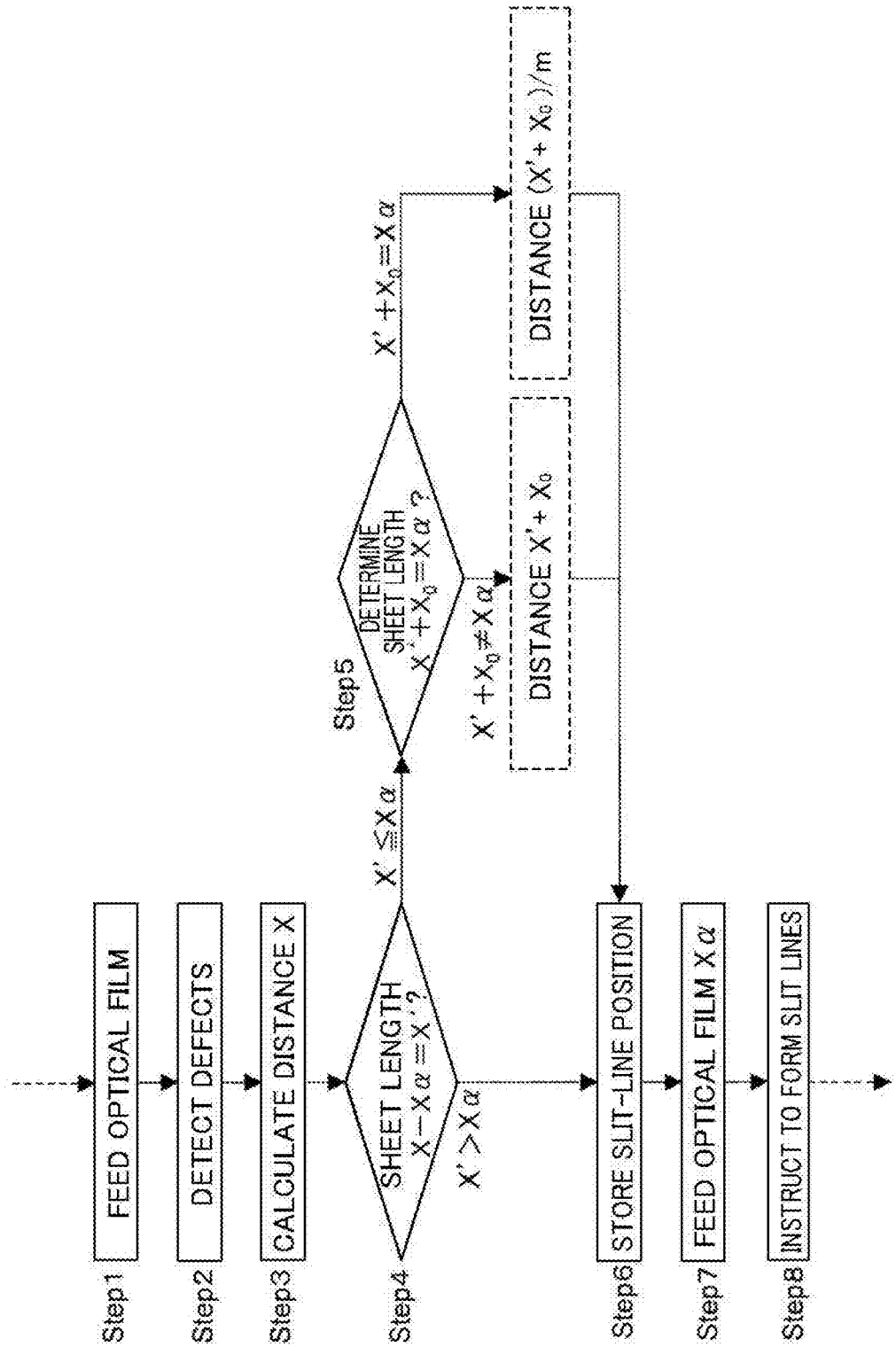
FIG. 18 is a flowchart showing a step to form slit line in a technique of modifying a distance to a next-slit-line formation position to $[(x'+x_0)/m]$ wherein $m=2$ or more, according to at least one embodiment.

FIGS. 16 to 18 are flowcharts showing different manners of calculating the positions at which respective ones of the slit lines 16 are to be formed in the continuous web of the optical film laminate 15 being transported.

In either case, in step 1, the control unit 700 operates to instruct the lamination drive mechanism 560 and the pair of feed rollers included in the take-up drive mechanism 630 to feed the polarizing composite film 11. In step 2, the control unit 700 operates to instruct the information processing device 710 and the storage device 720 to associate the image data from the image reading device 581 and the feed-length measurement data measured from a leading edge of the polarizing composite film 11 by the distance measurement device 570 and perform information processing on them, so as to produce position data of positions of defects in the polarizing composite film 11, and store the data in the storage device 720. In steps 3 and 4, the control unit 700 defines the polarizing composite film 11 into defect-free region ($x_\alpha$) and defective region ($x_\beta$) based on the position information on the detected locations of a defect or defects. Further, the control unit 700 produces a slit position information for sequentially forming the normal polarizing sheet ($x_\alpha$) and defective polarizing sheet ($x_\beta$) being separated from the normal polarizing sheet in the polarizing composite film 11 having an adhesive layer, each corresponding to the defect-free region ($x_\alpha$) and the defective region ($x_\beta$) in the defined polarizing composite film without adhesive layer 11'', on the carrier film 13 of the continuous web of the optical film laminate 15 to be manufactured in the later process, at the slit-forming station N, using the slitting unit 600. The slit-position information is provided for indicating positions at which respective ones of the slit lines 16 are to be formed in the continuous web of the optical film laminate and is also stored in the storage device 720.

In step 3, the control unit 700 functions to operate the information processing device 710 to calculate the distance X between location of the defect of the polarizing composite film 11 being fed and the reference position, and store the calculated distance X in the storage device 720. As shown in FIG. 15, the distance X is a distance for example between the position of the inspection unit 580 and the position of the carrier film lamination unit 590 (or the reference position of the polarizing composite film 11).

In Step 4, the control unit 700 further functions to operate the information processing device 710 to subtract the length ($x_\alpha$) corresponding to that of the defect-free region from the distance x to obtain a distance $(x-x_\alpha)=x'$, and then store the distance x' in the storage device 720. The length $x_\alpha$ corresponding to that of the defective-free region of the polarizing composite film is determined by a system manager based on the size of the liquid-crystal panel and pre-stored in the storage device 720. Then, the control unit 700 functions to operate the information processing device 710 to determine whether the calculated distance x' is greater or less than the length $x_\alpha$ corresponding to that of the defect-free region of the polarizing composite film 11. Specifically, if the relation x' (or x'') in FIG. 15>$x_\alpha$ is established, it is understood that the defect-free region $x_\alpha$ of the polarizing composite film 11 can be ensured, so that the control unit 700 instructs the lamination drive mechanism 560 or the film feed drive mechanism 560' and the pair of feed rollers 631 included in the take-up drive mechanism 630 to have the polarizing composite film 11 delivered under tension by the length $x_\alpha$ of the defect-free region. The value of the length $x_\alpha$ in this instance is the slit-position information for forming a normal polarizing sheet $x_\alpha$ corresponding to the defect-free region ($x_\alpha$) in the polarizing composite film 11.

To the contrary, if the relation is x' (or x'')≦$x_\alpha$, i.e., x''' in FIG. 15≦$x_\alpha$, it is understood that the defect-free region ($x_\alpha$) of the polarizing composite film 11 cannot be ensured. In this instance, the region of the polarizing composite film 11 having the length $x_\beta$ provides the defective region ($x_\beta$), so that the control unit 700 functions to operate the information processing device 710 to calculate the length $(x'+x_0)=x_\beta$ corresponding to the defective region ($x_\beta$) by adding a constant value $x_0$ to x' (x''' in FIG. 15), and to instruct the lamination drive mechanism 560 or the film feed drive mechanism 560', and the pair of feed rollers 631 included in the take-up drive mechanism 630 to have the polarizing composite film delivered under tension by the length $x_\beta$ of the defective region. The value $x_\beta$ in this instance is the slit-position information for forming a defective polarizing sheet $x_\beta$ corresponding to the defective region ($x_\beta$) of the polarizing composite film 11.

The control unit 700 operates to calculate the following (a) and (b) to create slit-position information indicative of the positions at which respective ones of the slit lines 16 are to be formed in the continuous web of the optical film laminate 15 to be manufactured in the later process to form normal polarizing sheets x$\alpha$ and defective polarizing sheets $x_\beta$ of a polarizing composite film 11 having the adhesive layer 12, and then store the slit-position information in the storage device 720:

(a) a distance $x_\alpha$ to the position for forming a next slit line, if x'>$x_\alpha$; and (b) a distance $(x'+x_0=x_\beta)$ to the position for forming a next slit line, if x'≦$x_\alpha$.

If the length $(x'+x_0=x_\beta)$ corresponding to that of the defective region ($x_\beta$) becomes equal to the length $x_\alpha$ corresponding to that of the defect-free region ($x_\alpha$), i.e., if $(x'+x_0)=(x_\alpha)$, the control unit 700 cannot identify or discriminate the defect-free region ($x_\alpha$) over the defective region ($x_\beta$). This means that the region to be recognized as the defective region ($x_\beta$) may not be recognized as the defective region, so that, for example, the defect-free region ($x_\alpha$) and the defective region ($x_\beta$) cannot be discriminated from each other based on feed-length measurement data on the feed length of the polarizing composite film 11, and the information created based on the feed-length measurement data $(x'+x_0)$ inevitably becomes imperfect. It is assumed that such situation occurs when the position of a defect in the polarizing composite film 11 is infinitely close to the position for forming a next slit line 16 in the polarizing composite film 11, or when a plurality of a series of defects are distributed over a length $x_\alpha$ corresponding to that of the defect-free region.

In step 5, if $(x'+x_0)=x_\alpha$ becomes equal to $x_\alpha$, the control unit 700 functions to operate the information processing device 710 to perform a calculation based on at least one of the following methods to create information for identifying or discriminating the defect-free region ($x_\alpha$) over the defective region ($x_\beta$).

In Step 5 illustrated in FIG. 16, even if, as the result of calculation conducted by the information processing device 710, the distance $(x'+x_0)$ to the position for forming a next slit line 16 becomes equal to the length $x_\alpha$ corresponding to that of the defect-free region, the region in said distance is not essentially the defect-free region ($x_\alpha$). In order to make it possible to recognize such a difference, defective-including information $x_\gamma$ or defective polarizing sheet $x_\beta$ identification information $x_\gamma$ is produced and stored in the storage device 720, wherein for example, a numerical suffix "0" may be associated with the slit-position information indicative of the position for forming a slit line 16 corresponding to the defect-free region ($x_\alpha$), and a numerical suffix "1" with the slit-position information indicating the position for forming a-slit line 16 corresponding to the defective region.

In step 5 illustrated in FIG. 17, if, as a result of calculation of the information processing device 710, the distance $(x'+x_0)$ to the position where a next-slit-line is to be formed becomes equal to the length $x_\alpha$ corresponding to that of the defect-free region ($x_\alpha$), an information processing is conducted so that the distance to the position where a next-slit-line is to be formed satisfies the relation $(x'+x_0')$, wherein $x_0'>x_0$, and store the distance $(x'+x_0')$ in the storage device 720. This information processing makes it possible by calculating the distance $(x'+x_0')$ different from $x_\alpha$, to allow the region having the length $(x'+x_0')$ to be identified or discriminated over the defect-free region $x_\alpha$.

Further, in step 5 illustrated in FIG. 18, if, as the result of calculation conducted by the information processing device 710, the distance $(x'+x_0)$ to the position where a next slit line 16 is to be formed becomes equal to the length $x_\alpha$ corresponding to that of the defect-free region $(x_\alpha)$, an information processing is carried out to allow the distance to the position where the next slit line 16 is to be formed to become $[(x'+x_0)/m]$, wherein m=2 or more, preferably 2 or 3, and store the distance $[(x'+x_0)/m]$ in the storage device 720. As in the case of FIG. 17, this information processing is also configured to calculate the $[(x'+x_0)/m]$ different from $x_\alpha$ to allow the region having the length $[(x'+x_0)/m]$ to be identified or discriminated over the defect-free region $(x_\alpha)$.

Summarizing the above, in the process for creating information for identifying or discriminating the defect-free region $(x_\alpha)$ and defective region $(x_\beta)$, either of the following methods may be adopted:

(1) A method of creating defect-including information as information for identifying or discriminating a region having a length $(x'+x_0)$ calculated by the information processing device 710 over the defect-free region $(x_\alpha)$;

(2) A method of creating a distance to the position where a next slit line 16 is to be formed which is calculated by the information processing device 710, as a distance $(x'+x_0')$ (wherein $x_0'>x_0$) which is different from the length $x_\alpha$; and (3) A method of creating a distance to the position where a next slit line 16 is to be formed which is calculated by the information processing device 710, as a distance $[(x'+x_0)/m]$ (wherein m=2 or more) which is different from the length $x_\alpha$.

Particularly, in cases where the method (2) or (3) is employed, $(x'+x_0)=(x_\alpha)$ is changed to $(x'+x_0')\ne x_\alpha$ or $[(x'+x_0)/m]\ne x_\alpha$. Thus, the position where a next-slit-line is to be formed position can be used as information indicating the defective region $(x_\beta)$ identified or discriminated over the defect-free region $(x_\alpha)$.

In either case, in step 6, the control unit 700 functions to operate the information processing device 710 to determine the length between the reference position (the position of the carrier film lamination unit 590 in FIG. 15) and the position where a next-slit-line is to be formed, based on the calculation result in steps 4 and 5. Then, in the methods (2) or (3), in step 7, the control unit 700 operates to cause the slitting position checkup unit 610 to store the length to the position where a next slit line 16 is to be formed as determined in step 6, in the storage device 720. However, in the case of the method (1), the control unit 700 functions to operate the information processing device 710 to store the length to the position of forming a next-slit-line in association with the defect-including information $x_\gamma$.

In either case, in Step 8, the control unit 700 functions to operate the slitting unit 600 provided on the slit-forming station N to form slits at the side opposite to the carrier film 13 to a depth reaching a surface of the carrier film adjacent to the adhesive layer to form slit lines 16 sequentially, so that the normal polarizing sheet $x_\alpha$ and defective polarizing sheet $x_\beta$ being separated from the normal polarizing sheet, of the polarizing composite film 11 having the adhesive layer 12 composing the continuous web of the optical film laminate 15, is sequentially formed on the carrier film 13 also composing the continuous web of the optical film laminate 15, when a continuous web of an optical film laminate 15 manufactured in the later process is carried to the slit forming station N, based on the position for forming a next-slit-line stored in Step 7.

In step 9, the slitting position checkup unit 610 provided in the slit-position checkup station P is adapted to perform the checkup process to check if there is a deviation between the position of the slit line 16 actually formed and the stored slitting position at which the slit line 16 is to be formed. As described earlier, the deviation between the slitting position at which the slit line 16 is to be formed (the reference position) on the continuous web of the optical film laminate 15 and the position of the slit line 16 actually formed is checked, and corrects the slitting position or the angle of the slitting unit 600 if there is a deviation, before forming the next slit line 16.

(Details of Defect Inspection Unit)

Figure 19:
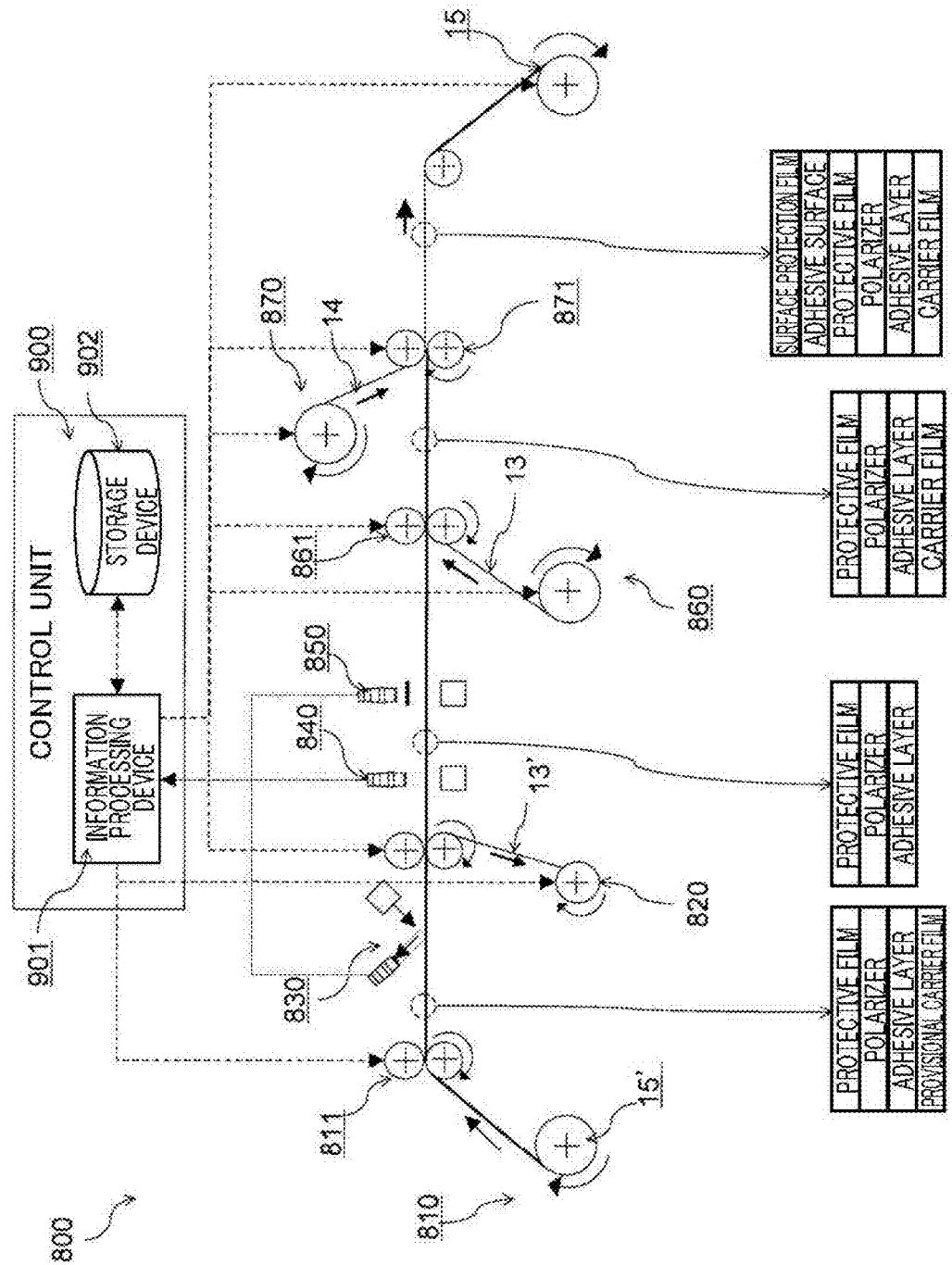
FIG. 19 is a schematic diagram showing a manufacturing system for a continuous web of an optical film laminate with predefined slit lines having three inspection units, according to at least one embodiment.

FIG. 19 shows one embodiment for detecting defects in a polarizing composite film having an adhesive layer according to the embodiment shown in FIG. 11 of the present disclosure whereby: a continuous web of a provisional optical film laminate 15' is carried to the peeling station L, and a provisional carrier film 13' composing the continuous web of the provisional optical film laminate 15' is peeled from the laminate to produce the polarizing composite film having the adhesive layer 12, wherein the manufactured polarizing composite film 11 having the adhesive layer 12 is inspected at the inspection station M comprising three inspection units to inspect the position of a defect or defects. The inspection units are not limited to those shown in the figure and are also applicable to the inspection unit M according to the embodiment shown in FIG. 10 of the present disclosure. FIG. 19 further shows a manufacturing system 800 for manufacturing a continuous roll of a continuous web of an optical film laminate 15 whereby: a carrier film 13 is releasably laminated on the polarizing composite film 11 having the adhesive layer 12 and when necessary, the surface-protection film is releasably laminated on the surface of the polarizing composite film 11 opposite to the surface on which the carrier film 13 is laminated to form the continuous roll of the optical film laminate 15. The manufacturing line for manufacturing the continuous web of the optical film laminate 15 is described in detail in the description of the manufacturing systems 500 and 500' in the first and the embodiment shown in FIG. 11, therefore, the description is omitted here.

The manufacturing system 800 comprises a take-up drive mechanism 820 for winding the provisional carrier film 13' in addition to the film feed unit 810 including a feed roller 811 for feeding the provisional optical film laminate 15'. The manufacturing system 800, as for inspection units, comprises the first inspection unit 830, the second inspection unit 840, and the third inspection unit 850, and these inspection units are controlled by the control unit 900 that includes an information processing device 910 and a storage device 920. A carrier film feed unit 860 including a lamination unit 861 and a surface-protection film feed unit 870 including a lamination unit 871 provided as needed, operate to releasably laminate the carrier film 13 to the exposed surface of the adhesive layer 12 of the inspected polarizing composite film 11 having the adhesive layer 12, and, when necessary, releasably laminate the surface-protection film to the surface of the polarizing composite film opposite to the surface on which the carrier film 13 is laminated. Thus, the continuous web of optical film laminate 15 is manufactured.

As shown in FIG. 19, the inspection units are disposed at respective three positions in the manufacturing system 800. The first inspection unit 830 is located between the feed roller 811 of the film feed unit 810 and the take-up drive mechanism 820 for winding the provisional carrier film 13', and adapted to inspect the continuous web of the provisional optical film laminate 15' to which the provisional carrier film 13' is laminated. The first inspection unit 830 inspects the surface of the polarizing composite film 11 by means of reflected light. Defects that can be inspected are defects such as uneven surface, scratches and spots on the surface which are detectable by CCD camera, as shown in FIG. 20.

The second inspection unit 840 is a transmission inspection unit that is designed such that light irradiated from a light source is projected to the polarizing composite film 11 having the adhesive layer 12 perpendicular thereto, and to have the light being received by an optical detection unit to detect one or more defects existing in the polarizing composite film 11 having the adhesive layer 12 in the form of a shade. Defects that can be inspected are defects such as foreign items or bubbles in the film.

The third inspection unit 850 is a defect inspection unit based on a crossed-Nichol condition. Along with the application of such defect inspection unit, the accuracy of the defect inspection of polarizing composite films has dramatically improved. Generally, manufacturers tend to use only the polarizing composite film that has passed the defect inspection based on the crossed-Nichol condition for large-size liquid-crystal display elements. The inspection method is as follows. First, the target polarizing composite film 11 having the adhesive layer 12 and the polarizing filter for it are disposed in such a manner as to allow their absorption axes to be oriented at a right angle. A light from the light source is irradiated on it and examine the transmitted light. Thus, one or more defects in the polarizing composite film 11 having the adhesive layer 12 is detected as one or more bright spots. The third inspection unit 850 is designed such that a light emitted from a light source is projected to the polarizing composite film having the adhesive layer perpendicularly or obliquely thereto and, with a polarization filter being disposed immediately before an optical detection unit so as to make an absorption axis thereof being oriented at a right angle with respect to an absorption axis of the polarizing composite film 11 having the adhesive layer 12, the light which has passed through the polarizing composite film 11 having the adhesive layer 12 is received by the optical detection unit to thereby detect one or more defects existing in the polarizing composite film 11 having the adhesive layer 12 as one or more bright spots. As shown in FIG. 20, all defects, except surface unevenness, are detected by the third inspection unit 850. Although each of the first, the second and the third inspection unit uses the polarizing composite film 11 having the adhesive layer 12 as the inspection target, it is needless to say that the polarizing composite film without adhesive layer 11" or other optically functional film can be used as the inspection target.

Although the preferred embodiments have been described, it will be understood that various changes and modifications will be made by those skilled in the art without departing from the spirit and scope of the invention. Accordingly, the present disclosure is not limited to the specific embodiments disclosed as the best mode for carrying out the disclosure, but intended to cover all embodiments included within the scope thereof.

What is claimed is:

1. A method of producing a continuous web of an optical film laminate adapted for use in a system for sequentially manufacturing liquid-crystal display elements by laminating optically functional film sheets formed to respective ones of liquid-crystal panels, the optically functional film sheets being formed to have a predefined dimension corresponding to a dimension of the liquid-crystal panels of a predefined size, the method comprising steps of:

laminating a continuous web of a protection film on at least one of opposite surfaces of a continuous web of a polarizer film to form an optically functional film having a longitudinal direction;

inspecting surfaces and inside of the optically functional film to detect a position of a defect existing in the optically functional film;

releasably laminating a continuous web of a carrier film on the continuous web of the optically functional film by an adhesive layer to form a continuous web of the optical film laminate, wherein the optically functional film includes at least one defect-free region and at least one defective region, the at least one defect-free and at least one defective region being defined along the longitudinal direction of the optically functional film in accordance with the position of the detected defect, said defect-free region having a predefined length corresponding to said dimension of the liquid-crystal panels, said defective region including at least one defect and defined as a region having a predefined length which is different from the length of said defect-free region, the length of the defective region being defined across said position of the defect; and sequentially forming slit lines in a transverse direction of said optical film laminate at a side opposite to said carrier film to a depth reaching a surface of said carrier film adjacent to said adhesive layer to form, on the carrier film, at least one defect-free, normal optically functional film sheet having no defect and at least one defective optically functional film sheet having at least one defect, and separated from the normal sheet, to thereby form a continuous web of the optical film laminate with slit lines including optically functional film sheets.

2. The method as defined in claim 1, wherein the method further comprises a step of winding the produced continuous web of the optical film laminate with slit lines into a roll to form a continuous roll of the optical film laminate with slit lines.

3. The method as defined in claim 1, wherein the method further comprises a step of forming a continuous web of optical film laminate that has a width corresponding to a width of liquid-crystal panel, and a step of releasably laminating a continuous web of surface-protection film on the surface of the continuous web of the optically functional film opposite to the surface on which the adhesive layer is laminated.

4. The method as defined in claim 1, wherein the step of inspecting surfaces and inside of the optically functional film to detect the position of a defect existing in the optically functional film comprises at least one of steps of:

inspecting a surface of the optically functional film by means of reflected light, inspecting inside of the optically functional film by transmitting light irradiated from a light source through the optically functional film to detect one or more defects existing in the optically functional film as one or more shades, or detecting one or more defects as one or more bright spots by cross-Nichol transmission inspection designed such that the light irradiated from a light source is projected to the optically functional film and a polarization filter, and the light which has transmitted through the optically functional film and the polarization filter is examined, with absorption axes of the optically functional film and polarization filter being oriented at a right angle.

5. A method of producing a continuous web of an optical film laminate adapted for use in a system for sequentially manufacturing liquid-crystal display elements by laminating optically functional film sheets to respective ones of liquid-crystal panels, the optically functional film sheets being formed to have a predefined dimension corresponding to a dimension of a plurality of liquid-crystal panels having a predefined size, the method comprising steps of:

providing a provisional optical film laminate at least including a continuous web of an optically functional film and a continuous web of a provisional carrier film, the continuous web of the optically functional film including a laminated web comprising a continuous web of a polarizer, a protection film laminated on at least one of opposite surfaces of the continuous web of polarizer and an adhesive layer provided on one of opposite surfaces of the laminated web, the continuous web of the provisional carrier film being releasably laminated on the adhesive layer;

peeling the provisional carrier film from the provisional optical film laminate while feeding the provisional optical film laminate, to expose the adhesive layer of the optically functional film;

inspecting surfaces and inside of the optically functional film with the adhesive layer in the exposed state to detect a position of a defect existing in the optically functional film;

releasably laminating a continuous web of a carrier film on the continuous web of the optically functional film by the adhesive layer to form a continuous web of the optical film laminate, wherein the optically functional film including at least one defect-free region having no defect and at least one defective region, the defect-free and defective regions being defined along longitudinal direction in accordance with the position of the detected defect, said defect-free region having a predefined length corresponding to said dimension of said liquid-crystal panels, said defective region having a predefined length which is different from the length of the defect-free region, the length of the defective region being defined across the defect; and sequentially forming slit lines in a transverse direction of said optical film laminate at a side opposite to said carrier film to a depth reaching a surface of said carrier film adjacent to said adhesive layer to form, on the carrier film, at least one defect-free, normal optically functional film sheet having no defect and at least one defective optically functional film sheet having at least one defect, to thereby form a continuous web of the optical film laminate with slit lines including optically functional film sheets.

6. The method as defined in claim 5, wherein the method further comprises a step of winding the produced continuous web of the optical film laminate with slit lines into a roll to form a continuous roll of the optical film laminate with slit lines.

7. The method as defined in claim 5, wherein the provisional carrier film has a transferable adhesive layer formed by, after subjecting one of opposite surfaces of the provisional carrier film to a releasing treatment, applying a solvent containing an adhesive to the treated surface and drying the solvent.

8. The method as defined in claim 5, wherein the surface of a final carrier film which is laminated to the exposed adhesive layer of the optically functional film is subjected to a releasing treatment.

9. The method as defined in claim 5, wherein the step of forming a continuous web of the optical film laminate forms a web of the optical film laminate having a width corresponding to the width of the liquid-crystal panel, wherein the method further includes a step of releasably laminating a continuous web of surface-protection film on the surface of the continuous web of the optically functional film opposite to the surface on which the adhesive layer is laminated.

10. The method as defined in claim 5, wherein the step of inspecting surfaces and inside of the optically functional film with the adhesive layer in the exposed state to detect the position of a defect existing in the optically functional film comprises at least one of the steps of:

inspecting the surface of the optically functional film by means of reflected light, inspecting the inside of the optically functional film by transmitting light irradiated from a light source through the optically functional film to detect one or more defects existing in the optically functional film as one or more shades, or detecting one or more defects as one or more bright spots by cross-Nichol transmission inspection designed such that the light irradiated from a light source is projected to the optically functional film and a polarization filter, and the light which has transmitted through the optically functional film and the polarization filter is examined, with absorption axes of the optically functional film and polarization filter being oriented at a right angle.

11. A method of producing a continuous web of an optical film laminate adapted for use in a system for sequentially manufacturing liquid-crystal display elements by laminating optically functional film sheets to respective ones of liquid-crystal panels, the optically functional film sheets being formed to have a predefined dimension corresponding to a dimension of a plurality of liquid-crystal panels having a predefined size, the method comprising steps of:

providing a provisional optical film laminate at least including a continuous web of an optically functional film and a continuous web of a provisional carrier film, the continuous web of the optically functional film including a laminated web comprising a continuous web of a polarizer, a protection film laminated on at least one of opposite surfaces of the continuous web of polarizer and an adhesive layer provided on one of opposite surfaces of the laminated web, the continuous web of the provisional carrier film being releasably laminated on the adhesive layer;

peeling the provisional carrier film from the provisional optical film laminate while feeding the provisional optical film laminate, to expose the adhesive layer of the optically functional film;

inspecting surfaces and inside of the optically functional film with the adhesive layer in the exposed state to detect a position of a defect existing in the optically functional film;

releasably laminating a continuous web of a carrier film on the continuous web of the optically functional film by the adhesive layer to form a continuous web of the optical film laminate, wherein the optically functional film including at least one defect-free region having no defect and at least one defective region, the defect-free and defective regions being defined along longitudinal direction in accordance with the position of the detected defect, said defect-free region having a predefined length corresponding to said dimension of said liquid-crystal panels, said defective region having a predefined length which is different from the length of the defect-free region, the length of the defective region being defined across the defect; and sequentially forming slit lines in a transverse direction of said optical film laminate at a side opposite to said carrier film to a depth reaching a surface of said carrier film adjacent to said adhesive layer to form, on the carrier film, at least one defect-free, normal optically functional film sheet having no defect and at least one defective optically functional film sheet having at least one defect, to thereby form a continuous web of the optical film laminate with slit lines including optically functional film sheets, wherein the surface of a final carrier film which is laminated to the exposed adhesive layer of the optically functional film is subjected to a releasing treatment.

12. The method as defined in claim 11, wherein the method further comprises a step of winding the produced continuous web of the optical film laminate with slit lines into a roll to form a continuous roll of the optical film laminate with slit lines.

13. The method as defined in claim 11, wherein the provisional carrier film has a transferable adhesive layer formed by, after subjecting one of opposite surfaces of the provisional carrier film to a releasing treatment, applying a solvent containing an adhesive to the treated surface and drying the solvent.

14. The method as defined in claim 11, wherein the step of forming a continuous web of the optical film laminate forms a web of the optical film laminate having a width corresponding to the width of the liquid-crystal panel, wherein the method further includes a step of releasably laminating a continuous web of surface-protection film on the surface of the continuous web of the optically functional film opposite to the surface on which the adhesive layer is laminated.

15. The method as defined in claim 11, wherein the step of inspecting surfaces and inside of the optically functional film with the adhesive layer in the exposed state to detect the position of a defect existing in the optically functional film comprises at least one of the steps of:

inspecting the surface of the optically functional film by means of reflected light, inspecting the inside of the optically functional film by transmitting light irradiated from a light source through the optically functional film to detect one or more defects existing in the optically functional film as one or more shades, or detecting one or more defects as one or more bright spots by cross-Nichol transmission inspection designed such that the light irradiated from a light source is projected to the optically functional film and a polarization filter, and the light which has transmitted through the optically functional film and the polarization filter is examined, with absorption axes of the optically functional film and polarization filter being oriented at a right angle.

* * * * *